United States Patent
Kawai et al.

(10) Patent No.: US 11,001,481 B2
(45) Date of Patent: May 11, 2021

(54) LOAD DETECTOR, AND WINDING APPARATUS FOR CRANE COMPRISING SAID DETECTOR

(71) Applicants: Kobe Steel, Ltd., Kobe (JP); KOBELCO CONSTRUCTION MACHINERY CO., LTD., Hiroshima (JP)

(72) Inventors: Hiroaki Kawai, Shinagawa-ku (JP); Takashi Hiekata, Kobe (JP); Koji Inoue, Kobe (JP); Takashi Tokuyama, Kobe (JP); Hiroshi Hashimoto, Kobe (JP); Toshiaki Shimoda, Kobe (JP); Shintaroh Sasai, Hyogo (JP); Tetsuya Ogawa, Hyogo (JP); Toshiro Yamashita, Hyogo (JP)

(73) Assignees: Kobe Steel, Ltd., Kobe (JP); KOBELCO CONSTRUCTION MACHINERY CO., LTD., Hiroshima (JP)

( * ) Notice: Subject to any disclaimer, the term of this patent is extended or adjusted under 35 U.S.C. 154(b) by 231 days.

(21) Appl. No.: 16/308,207

(22) PCT Filed: Jun. 5, 2017

(86) PCT No.: PCT/JP2017/020804
§ 371 (c)(1),
(2) Date: Dec. 7, 2018

(87) PCT Pub. No.: WO2017/221682
PCT Pub. Date: Dec. 28, 2017

(65) Prior Publication Data
US 2019/0300339 A1    Oct. 3, 2019

(30) Foreign Application Priority Data

Jun. 22, 2016   (JP) .............................. JP2016-123365
Feb. 8, 2017   (JP) .............................. JP2017-021000

(51) Int. Cl.
*B66C 13/16*    (2006.01)
*G01G 19/18*    (2006.01)
(Continued)

(52) U.S. Cl.
CPC .............. *B66C 13/16* (2013.01); *B66C 13/22* (2013.01); *B66C 23/905* (2013.01); *G01G 19/18* (2013.01); *B66C 2700/08* (2013.01); *G01G 9/00* (2013.01)

(58) Field of Classification Search
CPC .......... G01G 9/00; G01G 19/14; G01G 19/18; B66C 13/16; B66C 13/22; B66C 23/905; B66C 2700/08
See application file for complete search history.

(56) References Cited

U.S. PATENT DOCUMENTS 4,677,579 A * 6/1987 Radomilovich .......... E02F 9/26
177/147
5,321,637 A * 6/1994 Anderson ............... E02F 9/264
702/174
(Continued)

FOREIGN PATENT DOCUMENTS

JP  1-313636 A  12/1989
JP  9-272663 A  10/1997
(Continued)

OTHER PUBLICATIONS

International Search Report dated Aug. 29, 2017 in PCT/JP2017/020804 filed Jun. 5, 2017.
(Continued)

*Primary Examiner* — Randy W Gibson
(74) *Attorney, Agent, or Firm* — Oblon, McClelland, Maier & Neustadt, L.L.P.

(57) ABSTRACT

An output-torque estimation unit obtains a value of a current input to a motor, from a power converter, and calculates an
(Continued)

estimated output torque value which is an estimated value of output torque of the motor, from the obtained value of the current. A load estimation unit estimates a load value of a hanging cargo based on the estimated output torque value which is calculated by the output-torque estimation unit, a speed reduction ratio of a speed reducer, an effective radius of a winch drum, and the winding number which is set by the number setting unit.

9 Claims, 20 Drawing Sheets

(51) Int. Cl.
    *G01G 9/00*         (2006.01)
    *B66C 13/22*      (2006.01)
    *B66C 23/90*      (2006.01)

(56) References Cited

U.S. PATENT DOCUMENTS

| | | | |
|---|---|---|---|
| 5,708,342 | A | 1/1998 | Nihei et al. |
| 9,182,270 | B2 * | 11/2015 | Verheyen .................. H02P 1/04 |
| 9,567,195 | B2 * | 2/2017 | Hall ......................... B66C 13/46 |
| 2006/0153482 | A1 | 7/2006 | Koike et al. |
| 2007/0065060 | A1 | 3/2007 | Koike et al. |
| 2012/0325021 | A1 * | 12/2012 | Nishikawa ............... B66D 3/18 |
| | | | 73/862.193 |
| 2015/0061557 | A1 | 3/2015 | Shouji |
| 2015/0379783 | A1 * | 12/2015 | Sallee ....................... G01L 3/14 |
| | | | 254/266 |

FOREIGN PATENT DOCUMENTS

| | | |
|---|---|---|
| JP | 6-337708 A | 12/1997 |
| JP | 2705112 B2 | 1/1998 |
| JP | 2000-166291 A | 6/2000 |
| JP | 2005-43336 A | 2/2005 |
| JP | 2008-127129 A | 6/2008 |
| JP | 4735518 B2 | 7/2011 |
| JP | 2013-177230 A | 9/2013 |
| JP | 2015-73385 A | 4/2015 |
| JP | 2015-157695 A | 9/2015 |
| JP | 2016-110396 A | 6/2016 |
| WO | WO 2013/137146 A1 | 9/2013 |
| WO | WO 2015/076116 A1 | 5/2015 |

OTHER PUBLICATIONS

Extended European Search Report dated Apr. 9, 2019 in European Patent Application No. 17815151.0, 8 pages.

* cited by examiner

SECTION (a)

SECTION (b)

1600

# LOAD DETECTOR, AND WINDING APPARATUS FOR CRANE COMPRISING SAID DETECTOR

TECHNICAL FIELD

The present invention relates to a load detector for a crane and a winding apparatus for a crane, including the same.

BACKGROUND ART

In a crane, a load of a hanging cargo is detected in order to monitor a state of the crane. For example, Patent Literature 1 discloses a technique of detecting tension of a derricking rope which maintains an attitude of a boom, using a load cell or the like, and correcting the tension of the derricking rope, using a correction coefficient which is set in accordance with a working attitude or operation, to thereby calculate a load value of a hanging cargo.

Also, Patent Literature 2 discloses a technique of obtaining a current value which depends on tension of a wire rope, using a load detector which includes a strain-gauge load cell provided in a tip end of a boom, to thereby calculate a load value of a hanging cargo from the obtained current value.

However, with regard to Patent Literature 1, since a load value of a hanging cargo is estimated using not tension of a wire rope for hanging a hanging cargo, but tension of a derricking rope, so that there is caused a problem of a large calculation error between an estimated load value and an actual load value of a hanging cargo.

With regard to Patent Literature 2, it is necessary to use an extra dedicated detector such as a load detector, and thus there are caused problems of an increased cost due to the number of components, and degradation of reliability at a time of breakdown.

CITATION LIST

Patent Literature

Patent Literature 1: JP 2015-157695 A
Patent Literature 2: JP 2013-177230 A

SUMMARY OF INVENTION

It is an object of the present invention to provide a technique of accurately detecting a load value of a hanging cargo without including an extra dedicated load detector, in a crane including a winch drum driven by a motor.

A load detector according to one aspect of the present invention is intended to detect a load of a hanging cargo, in a crane including: a winch drum around which a wire rope for hanging the hanging cargo is wound; a motor configured to drive the winch drum to achieve lowering or hoisting; a speed reducer configured to adjust torque of the motor at a predetermined speed reduction ratio and transfer the torque to the winch drum; and a power converter configured to supply a current for driving the motor to the motor, and the load detector includes: an output-torque estimation unit configured to obtain, from the power converter, a value of the current supplied to the motor and estimate output torque of the motor from the value of the current that is obtained; a number setting unit configured to set the winding number of the wire rope; and a load estimation unit configured to estimate a load value of the hanging cargo based on an estimated output torque value resulting from estimation by the output-torque estimation unit, the speed reduction ratio, an effective radius of the winch drum, and the winding number that is set by the number setting unit.

According to the present invention, it is possible to accurately detect a load value of a hanging cargo using only output information of a motor, without providing an extra dedicated load detector.

DESCRIPTION OF EMBODIMENTS

First Embodiment

Figure 1:
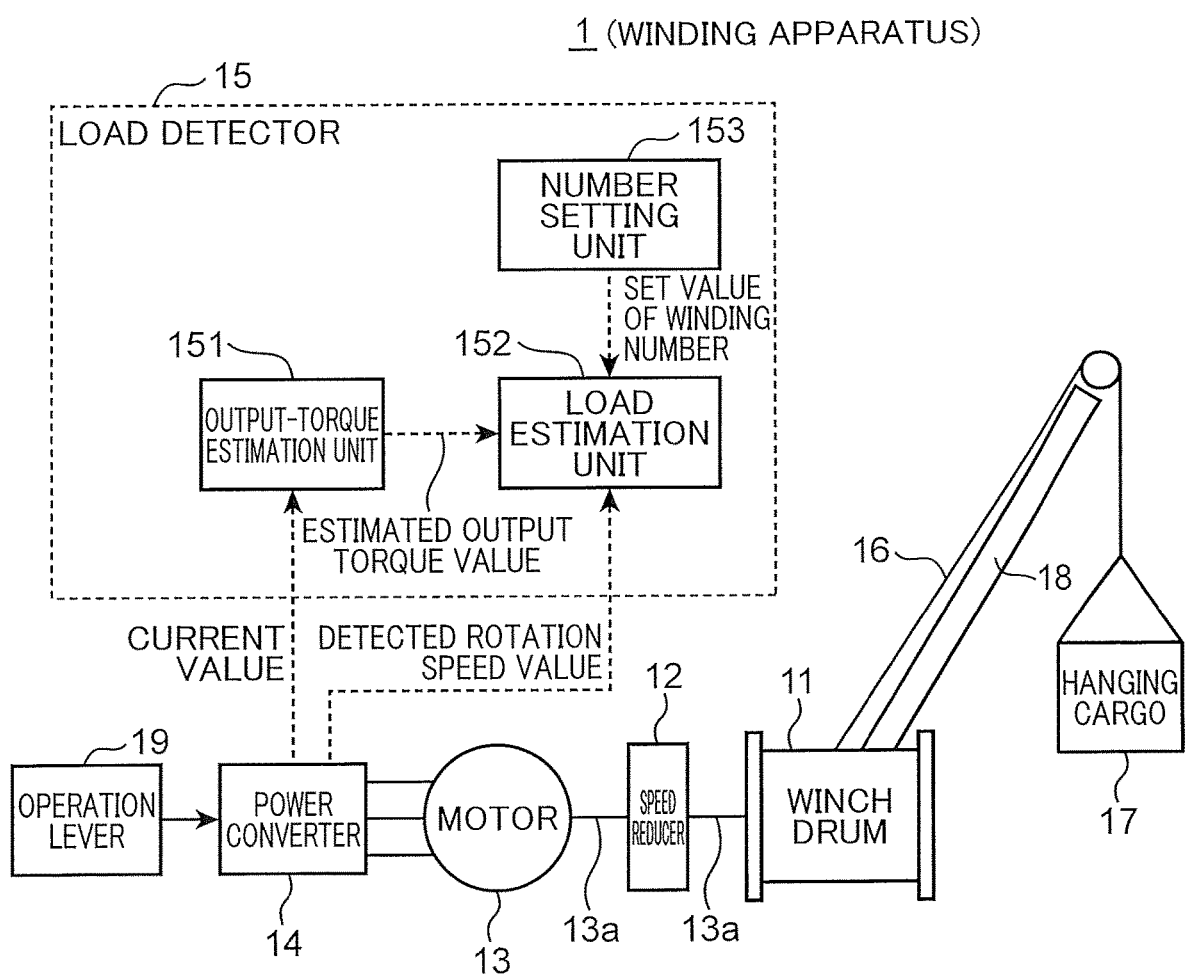
FIG. 1 is a block diagram showing a configuration of a winding apparatus according to a first embodiment of the present invention.

FIG. 1 is a block diagram showing a configuration of a winding apparatus 1 for a crane according to a first embodiment of the present invention. The winding apparatus 1 is applied to a crane, and includes a winch drum 11, a speed reducer 12, a motor 13, a power converter 14, a load detector 15, a wire rope 16, and an operation lever 19.

A boom 18 is provided in a body of the crane not shown in the drawings in such a manner that the boom 18 can rise up and lie down. A hanging cargo 17 is hung from a tip end of the boom 18 via the wire rope 16. It is noted that the hanging cargo 17 is hung using a hook (not shown) provided in a tip end of the wire rope 16.

The winch drum 11 around which the wire rope 16 is wound, is connected to a rotation shaft 13a of the motor 13 with the speed reducer 12 being interposed. Upon transmission of torque of the motor 13 to the winch drum 11 via the speed reducer 12 and the rotation shaft 13a, the wire rope 16 is wound around, or paid out from, the winch drum 11, so that the wire rope 16 is hoisted or lowered. The speed reducer 12 adjusts torque of the motor 13, and transmits the adjusted torque to the winch drum 11.

The motor 13 includes a three-phase electric motor, for example, and drives the winch drum 11 to achieve lowering or hoisting.

The power converter 14 includes a three-phase inverter, for example, and supplies a current for driving the motor 13 at a predetermined speed, to the motor 13.

The load detector 15 includes a processor such a CPU, for example, and detects a load of the hanging cargo 17. Then, the load detector 15 includes an output-torque estimation unit 151, a load estimation unit 152, and a number setting unit 153.

The output-torque estimation unit 151 obtains a value of a current supplied to the motor 13, from the power converter 14, and calculates an estimated output torque value which is an estimated value of output torque of the motor 13, from the obtained current value.

The load estimation unit 152 estimates a load value of the hanging cargo 17, based on an estimated output torque value calculated by the output-torque estimation unit 151, a speed reduction ratio of the speed reducer 12, an effective radius of the winch drum, and the winding number which is set by the number setting unit 153.

The number setting unit 153 sets the winding number of the wire rope 16. The winding number is the number of sheaves (not shown) around which the wire rope 16 is wound, for example. It is noted that the number setting unit 153 includes an operation apparatus which is provided in a cabin of a crane and allows an operator to set the winding number, for example. The number setting unit 153 can set the winding number in accordance with the winding number which is input by an operator through an operation on the operation apparatus.

The operation lever 19 accepts input of an operation which is performed by an operator in order to drive the winch drum 11 to achieve hoisting or lowering. The operation lever 19 is configured so as to be tiltable backward and forward or leftward and rightward relative to a neutral position at a center, for example. When the operation lever 19 is tilted in one direction corresponding to a hoisting direction relative to a neutral position, the operation lever 19 outputs an operation amount corresponding to a tilt amount, to the power converter 14, and when the operation lever 19 is tilted in the other direction corresponding to a lowering direction relative to a neutral position, the operation lever 19 outputs an operation amount corresponding to a tilt amount, to the power converter 14. For example, the operation lever 19 may be designed such that an operation amount has a negative value when the operation lever 19 is operated in a lowering direction, and an operation amount has a positive value when the operation lever 19 is operated in a hoisting direction.

Figure 2:
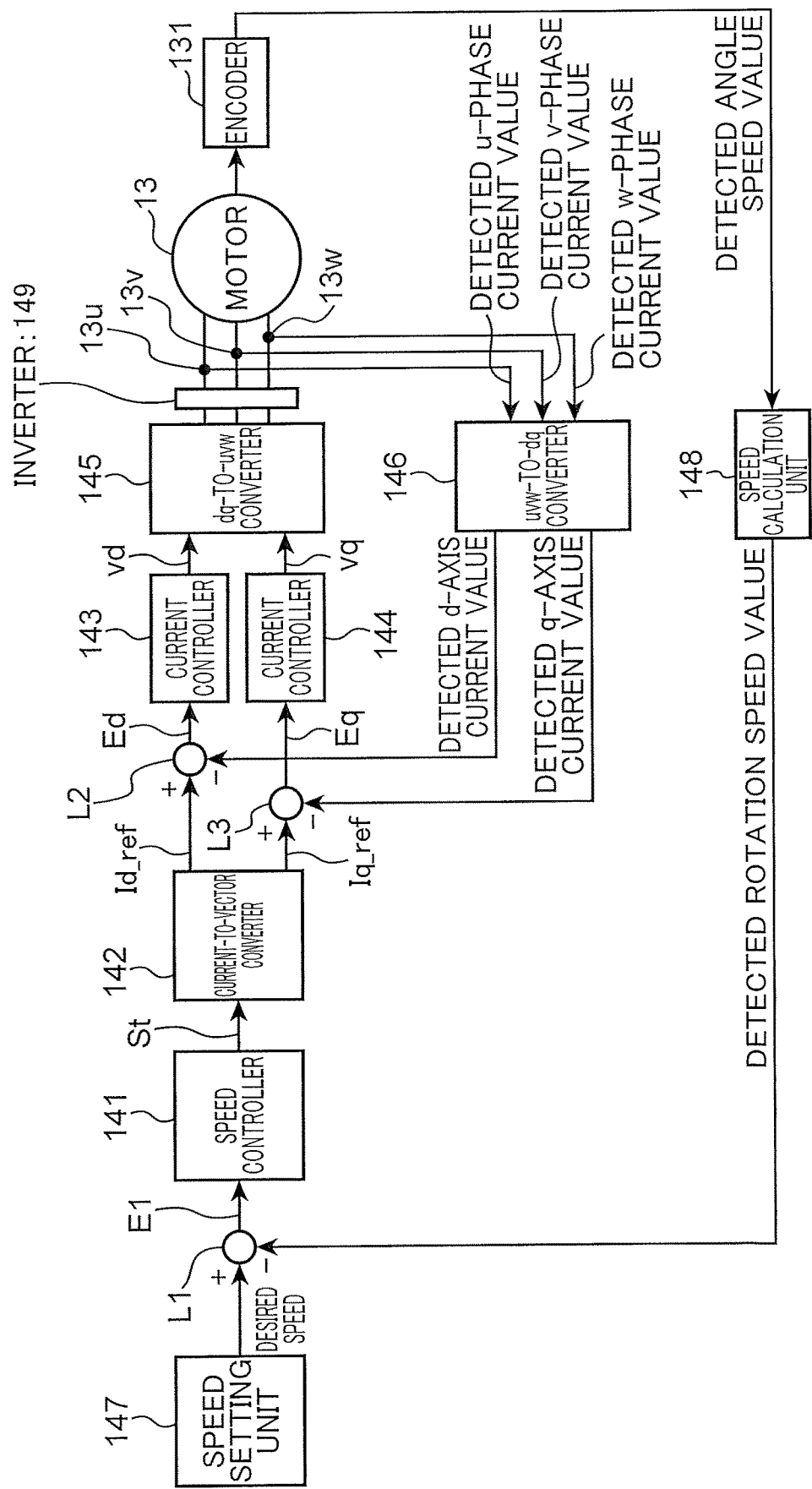
FIG. 2 is a block diagram showing a configuration of a power converter.

FIG. 2 is a block diagram showing a configuration of the power converter 14. The power converter 14 includes a speed controller 141, a current-to-vector converter 142, current controllers 143 and 144, a dq-to-uvw converter 145, a uvw-to-dq converter 146, a speed setting unit 147, a speed calculation unit 148, an inverter 149, and subtracters L1, L2, and L3.

The speed setting unit 147 sets a desired speed of the motor 13 in accordance with an operation amount of the operation lever 19. In this regard, the speed setting unit 147 can set a desired speed by referring to a table which previously defines a relationship between an operation amount and a desired speed, such that a desired speed increases in a negative direction as an operation amount increases in a negative direction, and a desired speed increases in a positive direction as an operation amount increases in a positive direction.

The subtracter L1 subtracts a detected rotation speed value which is a detected value of a rotation speed of the motor 13 from a desired speed, to calculate a deviation E1.

The speed controller 141 calculates a command torque value St which makes the deviation E1 equal to zero. The current-to-vector converter 142 determines a desired d-axis current value $I_{d\_}$ref and a desired q-axis current value $I_{q\_}$ref based on the command torque value St. In this regard, the current-to-vector converter 142 can determine values which are previously determined in accordance with the command torque value St, as the desired d-axis current value $I_{d\_}$ref and the desired q-axis current value $I_{q\_}$ref, for example.

The subtracter L2 subtracts a detected d-axis current value $I_d$ which is a detected value of a d-axis current from the desired d-axis current value $I_{d\_}$ref, to calculate a deviation Ed. The subtracter L3 subtracts a detected q-axis current value $I_q$ which is a detected value of a q-axis current from the desired q-axis current value $I_{q\_}$ref, to calculate a deviation Eq.

The current controller 143 calculates a command d-axis voltage value $v_d$ which is a command voltage value of a d axis and makes the deviation Ed equal to zero. The current controller 144 calculates a command q-axis voltage value $v_q$ which is a command voltage value of a q axis and makes the deviation $E_q$ equal to zero.

The dq-to-uvw converter 145 converts the command d-axis voltage value $v_d$ and the command q-axis voltage value $v_q$ into u-phase, v-phase, and w-phase command voltage values, and outputs them to the inverter 149. The inverter 149 turns on or off a switching element in accordance with u-phase, v-phase, and w-phase command voltage values, generates a u-phase input voltage, a v-phase input voltage, and a w-phase input voltage, and drives the motor 13.

Current sensors 13*u*, 13*v*, and 13*w* include current sensors such as Hall-effect devices, for example, and sense detected u-, v-, and w-phase current values which are detected current values of three phases including a u phase, a v phase, and a w phase, being supplied from the inverter 149 to the motor 13.

An encoder 131 includes a rotary encoder, for example, and sequentially measures a rotation angle of a rotor of the motor 13, and sequentially outputs the measured rotation angle as a detected rotation angle value, to the speed calculation unit 148.

The speed calculation unit 148 calculates a rotation speed of the motor 13 by differentiation of the detected rotation angle value which is sequentially calculated by the encoder 131, and outputs the calculated rotation speed as a detected rotation speed value, to the subtracter L1.

Figure 3:
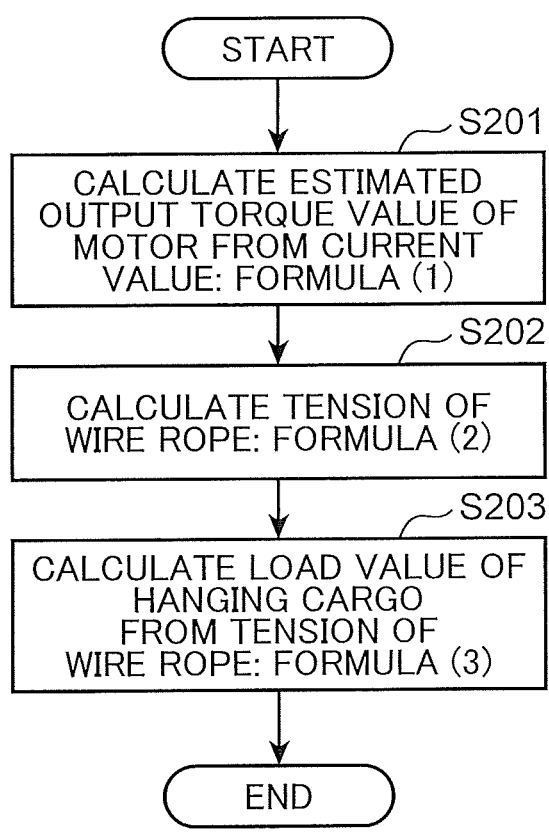
FIG. 3 is a flowchart showing an example of a process for detecting a load value of a hanging cargo.

FIG. 3 is a flowchart showing an example of a process for detecting a load value of the hanging cargo 17. The flowchart is put into practice when an operator operates the operation lever 19, for example.

[Step S201]

The output-torque estimation unit 151 obtains a value of a current supplied to the motor 13, from the power converter 14, and calculates an estimated output torque value. For example, if the motor 13 includes a brushless motor, it is general that the motor 13 is subjected to vector control using the configuration shown in FIG. 2. In this regard, while the motor 13 is subjected to vector control in the present embodiment, this is one example.

If a permanent-magnet synchronous motor which is one example of a brushless motor is employed as the motor 13, for example, an estimated output torque value is calculated from d-axis and q-axis current values using a formula (1). Accordingly, the output-torque estimation unit 151 can obtain a detected d-axis current value and a detected q-axis current value which are output from the uvw-to-dq converter 146 (refer to FIG. 2) as current values for driving the motor 13.

[Formula 1]

$$T_q = P_n \left\{ \Psi_a I_q + \frac{1}{2}(L_q - L_d) I_d I_q \right\} \quad (1)$$

Variables in the formula (1) are as follows.

$T_q$: an estimated output torque value, $P_n$: the number of pole pairs, $I_d$: a detected d-axis current value, $I_q$: a detected q-axis current value, $\Psi_a$: flux linkage of a permanent magnet, $L_d$: d-axis inductance, and $L_q$: q-axis inductance.

It is noted that, in the parentheses in the formula (1), the first term represents magnet torque and the second term represents reluctance torque. Also, in the formula (1), as the number of pole pairs $P_n$, the flux linkage $\Psi_a$, the d-axis inductance $L_d$, and the q-axis inductance $L_q$, values which are previously determined in accordance with specifications of the motor 13 are employed.

While the estimated output torque value $T_q$ is calculated using the formula (1) in the above case, which is one example, the estimated output torque value $T_q$ may be calculated using only either the first term of the formula (1) or the second term of the formula (1). Or, the estimated output torque value $T_q$ may be calculated using a mathematical expression conforming to a kind of the motor 13. In such a case, the estimated output torque value $T_q$ may be calculated using a mathematical expression which conforms to a kind of the motor 13 and is intended to calculate the estimated output torque value $T_q$, using a necessary one out of parameters including the number of pole pairs $P_n$, the flux linkage $\Psi_a$, a value of a current supplied to the motor 13, inductance of the motor 13, depending on a kind of the motor 13.

[Step S202]

The load estimation unit 152 calculates tension of the wire rope 16 using a formula (2) which is a mathematical expression for converting torque into force based on the estimated output torque value $T_q$ which is calculated in the step S201.

[Formula 2]

$$F = \frac{nKT_q}{R} \quad (2)$$

Variables in the formula (2) are as follows.

F: tension, n: a speed reduction ratio of the speed reducer 12, $T_q$: an estimated output torque value, R: an effective radius of the winch drum 11, and k: the winding number set by the number setting unit 153.

While tension is calculated using the formula (2) in the above case, the present invention is not limited to that, and any mathematical expression that converts the estimated output torque value $T_q$ into tension may be used.

[Step S203]

The load estimation unit 152 obtains a mass of the hanging cargo 17 using a formula (3) which divides tension of the wire rope 16, the tension being obtained by the formula (2), by gravitational acceleration.

[Formula 3]

$$m = \frac{F}{g} \quad (3)$$

Variables in the formula (3) are as follows.

m: a load value (mass) of a hanging cargo, g: gravitational acceleration, F: tension obtained by the formula (2), and k: the winding number set by the number setting unit 153.

While a mass of a hanging cargo is calculated using the formula (3) in the above case, the present invention is not limited to that, and any other mathematical expression that can convert tension into a mass of a hanging cargo may be used.

In the winding apparatus 1, the estimated output torque value $T_q$ of the motor 13 is calculated from a value of a current supplied to the motor 13, and a load value of the hanging cargo 17 is estimated based on the estimated output torque value $T_q$ which is calculated and the pre-known specifications of the crane, such as the winding number of the wire rope 16, a speed reduction ratio of the speed reducer 12, and an effective radius of the winch drum 11. Accordingly, as compared to a method of calculating a load value of a hanging cargo based on tension of a derricking rope, a load value of a hanging cargo can be detected more directly, so that a load value of a hanging cargo can be more accurately calculated.

Also, according to the present embodiment, a value of a current supplied to the motor 13 is obtained in order to estimate a load value of the hanging cargo 17, which eliminates a need to provide an extra detector dedicated to detection of tension of the wire rope 16, so that the number of components can be reduced and a lower cost and improved reliability can be attained.

Second Embodiment

According to the method of the first embodiment, a load value of a hanging cargo 17 can be accurately calculated from an estimated output torque value $T_q$ of a motor 13 when the hanging cargo 17 is at rest. However, when the hanging cargo 17 is hoisted or lowered while being accelerated or decelerated, for example, the estimated output torque value $T_q$ fluctuates under the influence of inertial forces of the hanging cargo 17, a winch drum 11, and the motor 13.

For this reason, in a case where a load value of the hanging cargo 17 is calculated by the method of the first embodiment, a load value of the hanging cargo 17 may possibly become larger or smaller than an actual load value at a time of accelerating or decelerating the hanging cargo 17.

Figure 4:
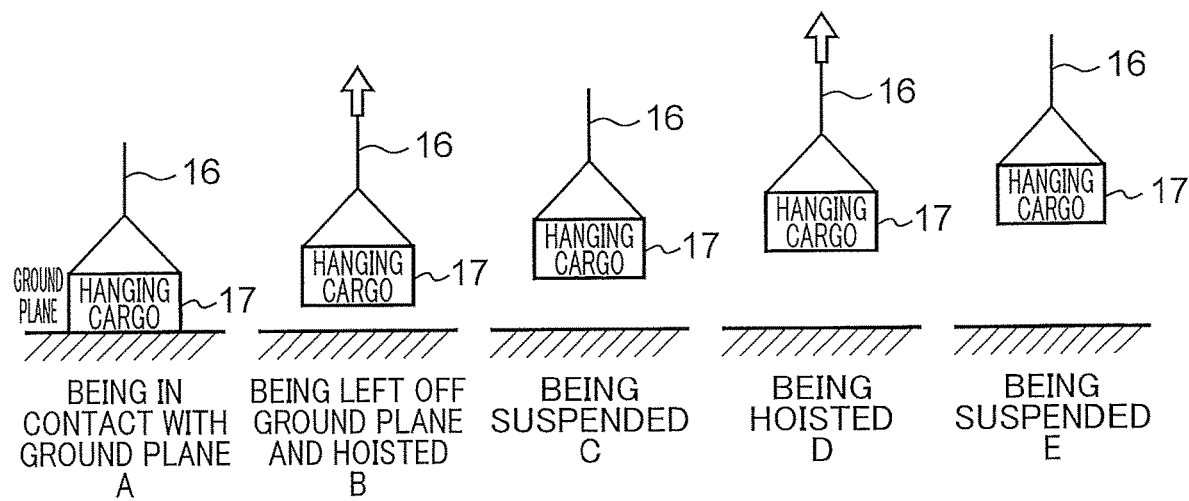
FIG. 4 is a view for explaining simulation which is carried out for calculating a load value of a hanging cargo at a time of hoisting.

FIG. 4 is a view for explaining simulation carried out for calculating a load value of the hanging cargo 17 at a time of hoisting. Shown is a way in which hoisting of the hanging cargo 17 proceeds along with progress of time domains from A, B, C, D, to E.

Figure 5:
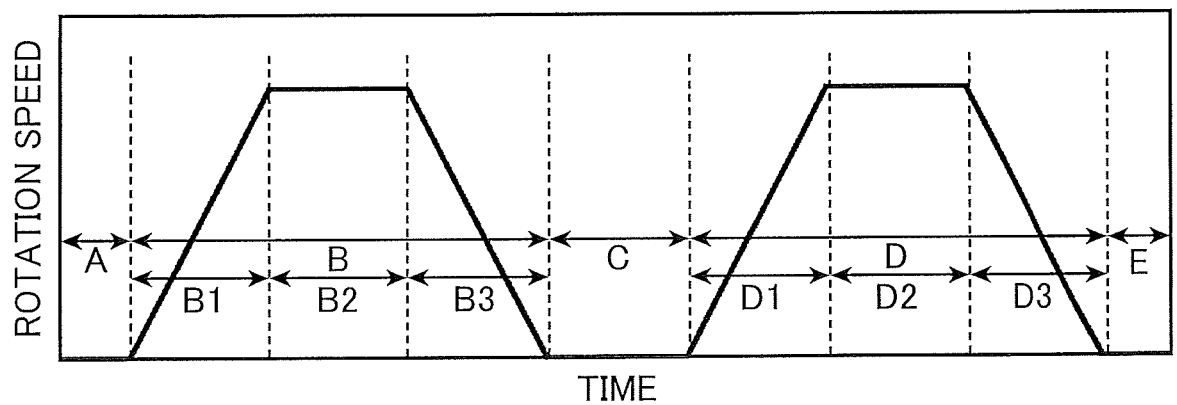
FIG. 5 is a graph showing a rotation speed of a motor in the simulation shown in FIG. 4.

FIG. 5 is a graph showing a rotation speed of the motor 13 in the simulation shown in FIG. 4, and a vertical axis represents a rotation speed of the motor 13 while a horizontal axis represents a time.

Figure 6:
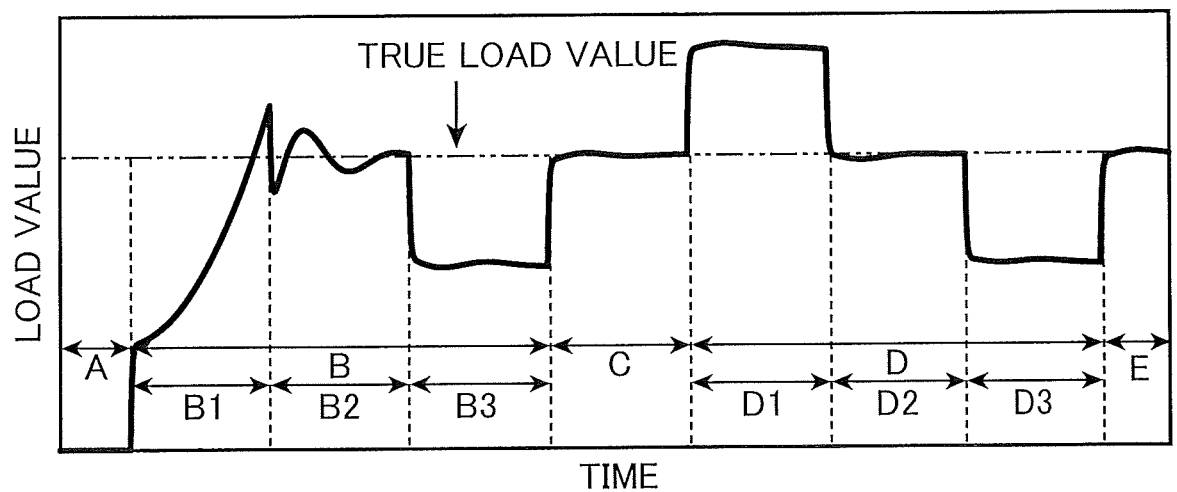
FIG. 6 is a graph showing a load value of a hanging cargo, the load value being calculated using a method of the first embodiment, in the simulation shown in FIG. 4.

FIG. 6 is a graph showing a load value of the hanging cargo 17, the load value being calculated by the method of the first embodiment in the simulation shown in FIG. 4, and a vertical axis represents a load value while a horizontal axis represents a time.

In the simulation, a time domain is divided into five time domains A, B, C, D, and E shown in FIG. 4, depending on a kind of an operation performed at a time of hoisting the hanging cargo 17. In the time domain A, hoisting is yet to be started and the hanging cargo 17 is in contact with a ground plane. In the time domain B, the hanging cargo 17 is hoisted and is dynamically left off a ground plane. In the time domain C, the hanging cargo 17 is suspended in the air. In the time domain D, the hanging cargo 17 is hoisted again. In the time domain E, the hanging cargo 17 is suspended in the air again.

With reference to FIG. 5, in the time domain A, the hanging cargo 17 is in contact with a ground plane, and so a rotation speed of the motor 13 is equal to zero. The time domain B is divided into three periods of an acceleration period B1, a constant-speed period B2, and a deceleration period B3. In the acceleration period B1, hoisting of the hanging cargo 17 is started, and a rotation speed increases with a certain inclination until it reaches a desired speed. In the constant-speed period B2, a rotation speed of the motor 13 reaches a desired speed, and so is kept constant. In the deceleration period B3, a desired speed is set to zero, and so a rotation speed of the motor 13 decreases toward zero with a certain inclination.

In the time domain C, a rotation speed of the hanging cargo 17 is kept equal to zero. The time domain D, like the time domain B, is divided into three periods of an acceleration period D1, a constant-speed period D2, and a deceleration period D3. The acceleration period D1, the constant-speed period D2, and the deceleration period D3 are similar to the acceleration period B1, the constant-speed period B2, and the deceleration period B3 in nature, respectively, and thus detailed description is omitted. In the time domain E, a rotation speed is kept equal to zero in the same manner as it is in the time domain A.

With reference to FIG. 6, in the acceleration period B1, a load is gradually applied to the wire rope 16 from a time when the motor 13 starts rotating to a time when the hanging cargo 17 is dynamically left off a ground plane, and a load value of the hanging cargo 17, the load value being calculated from the estimated output torque value $T_q$, gradually increases. This is because elastic deformation of the wire rope 16 is considered in the simulation.

A matter of concern in this case is that a calculated load value becomes larger or smaller than an actual load value (true value) and an error occurs at a time of accelerating or decelerating the hanging cargo 17 as shown in the deceleration period B3, the acceleration period D1, and the deceleration period D3.

This is because the estimated output torque value $T_q$ of the motor 13 fluctuates under the influence of inertial forces of the hanging cargo 17, the winch drum 11, and the motor 13 at a time of acceleration or deceleration.

For example, in the acceleration period D1, gravity acts in a direction opposite to a direction in which the hanging cargo 17 is accelerated, so that a value of a current supplied to the motor 13 should be made larger than a value of a current in the constant-speed period D2. Thus, the estimated output torque value $T_q$ increases, and a load value of the hanging cargo 17 becomes larger than a true value.

Also, for example, in each of the deceleration periods B3 and D3, gravity acts on the hanging cargo 17 in a direction in which the hanging cargo 17 is decelerated, so that a value of a current supplied to the motor 13 should be made smaller than a value of current in each of the constant-speed periods B2 and D2. Thus, the estimated output torque value $T_q$ decreases, and a load value of the hanging cargo 17 becomes smaller than a true value. It is noted that a load value of the hanging cargo 17 is substantially equal to a true value in each of the constant-speed periods B2 and D2. In this manner, as a result of fluctuation of the estimated output torque value $T_q$, a load value correspondingly fluctuates, so that an error with respect to a true value occurs.

In such a situation, in a second embodiment, a load estimation unit 152 obtains a detected rotation angle value of the motor 13 from an encoder 131 of a power converter 14, and calculates a first fluctuation amount indicating an amount of fluctuation of the estimated output torque value $T_q$, the fluctuation being caused due to inertial forces of the hanging cargo 17, the winch drum 11, and the motor 13 at a time of hoisting or lowering, based on the detected rotation angle value which is obtained. Then, the load estimation unit 152 corrects the estimated output torque value $T_q$ such that the first fluctuation amount is compensated for, and calculates a load value of the hanging cargo 17 using the estimated output torque value $T_q$ which is corrected.

More specifically, the load estimation unit 152 calculates a load value of the hanging cargo 17 using the following formula (4)-b.

[Formula 4]

$$J\frac{d^2\theta}{dt^2} = T_q - \frac{mR}{nk}\left(\frac{R}{nk}\frac{d^2\theta}{dt^2} + g\right) \quad (4)\text{-}a$$

-continued $$m = \frac{T_q - J\frac{d^2\theta}{dt^2}}{\frac{R}{nk}\left(\frac{R}{nk}\frac{d^2\theta}{dt^2} + g\right)} \quad (4)\text{-b}$$

Here, variables in the formulae (4)-a and (4)-b are as follows.

$T_q$: an estimated output torque value, J: a synthetic value of moments of inertia of the winch drum 11, the motor 13, and a speed reducer 12, k: the winding number, n: a speed reduction ratio, R: an effective radius of a winch drum, g: gravitational acceleration, θ: a detected rotation angle value, and m: a mass of the hanging cargo 17

It is noted that the formula (4)-b is derived from an equation of motion (4)-a of a system including the hanging cargo 17, the winch drum 11, and the motor 13.

In the formula (4)-a, the second term of the right side corresponds to the above-described first fluctuation amount. With reference to the formula (4)-a, when the hanging cargo 17 is hoisted, for example, since angular acceleration which is the second-order derivative ($d^2\theta/dt^2$) of the detected rotation angle value θ becomes positive at a time of acceleration of the hanging cargo 17, the second term acts in a direction in which the estimated output torque value $T_q$ decreases. As a result of this, an increment in the estimated output torque value $T_q$, the increment being caused under the influence of inertial forces of the hanging cargo 17, the winch drum 11, and the motor 13, is subtracted from the estimated output torque value $T_q$. On the other hand, when the hanging cargo 17 is hoisted, since angular acceleration becomes negative at a time of deceleration, the second term acts in a direction in which the estimated output torque value $T_q$ increases. As a result of this, a decrement in the estimated output torque value $T_q$, the decrement being caused under the influence of inertial forces of the hanging cargo 17, the winch drum 11, and the motor 13, is added to the estimated output torque value $T_q$.

Figure 7:
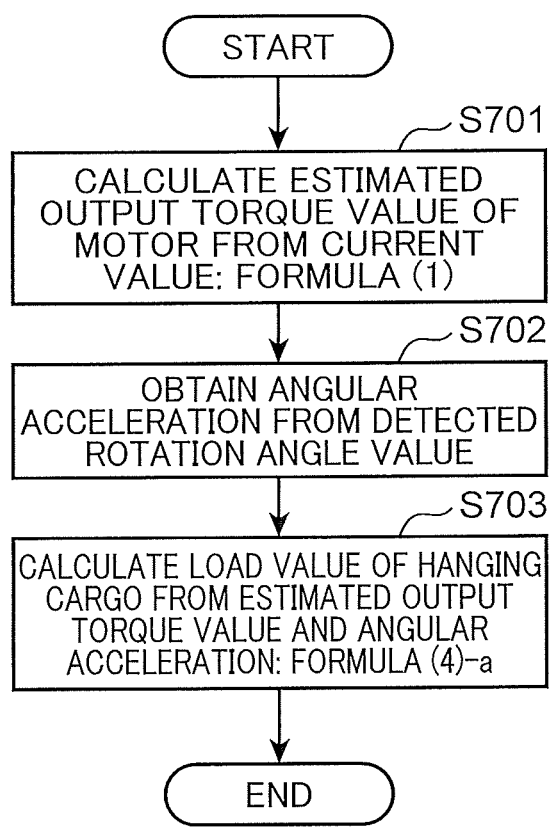
FIG. 7 is a flowchart showing an example of a process performed by a winding apparatus according to a second embodiment of the present invention.

FIG. 7 is a flowchart showing an example of a process performed by the winding apparatus 1 according to the second embodiment of the present invention.

[Step S701]

An output-torque estimation unit 151 calculates the estimated output torque value $T_q$ using the formula (1) in the same manner as that in the step S201.

[Step S702]

The load estimation unit 152 differentiates the detected rotation angle value θ which is obtained from the power converter 14, to calculate angular acceleration.

[Step S703]

The load estimation unit 152 substitutes the estimated output torque value $T_q$ which is calculated in the step S701 and the angular acceleration which is calculated in the step S702 into the formula (4)-b, to calculate a load value of the hanging cargo 17.

Figure 9:
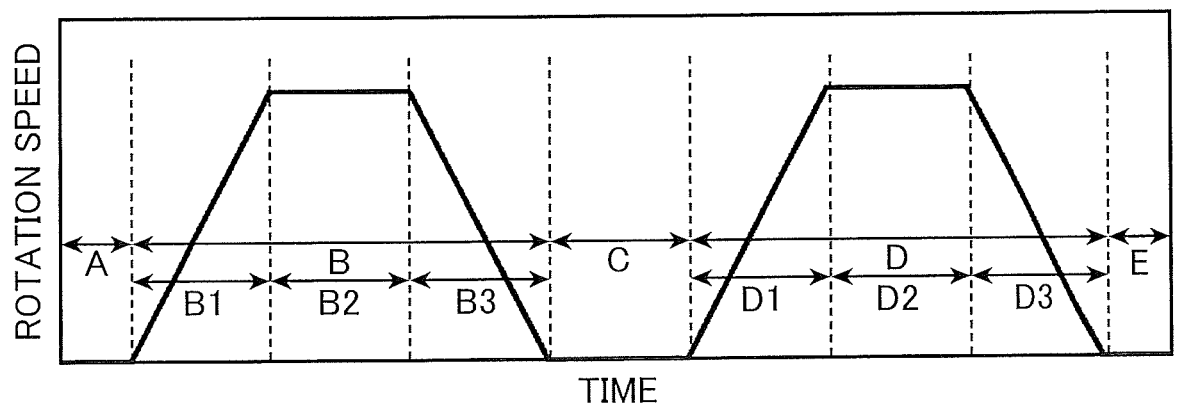
FIG. 9 is a graph showing a rotation speed of a motor in the simulation shown in FIG. 4.
Figure 10:
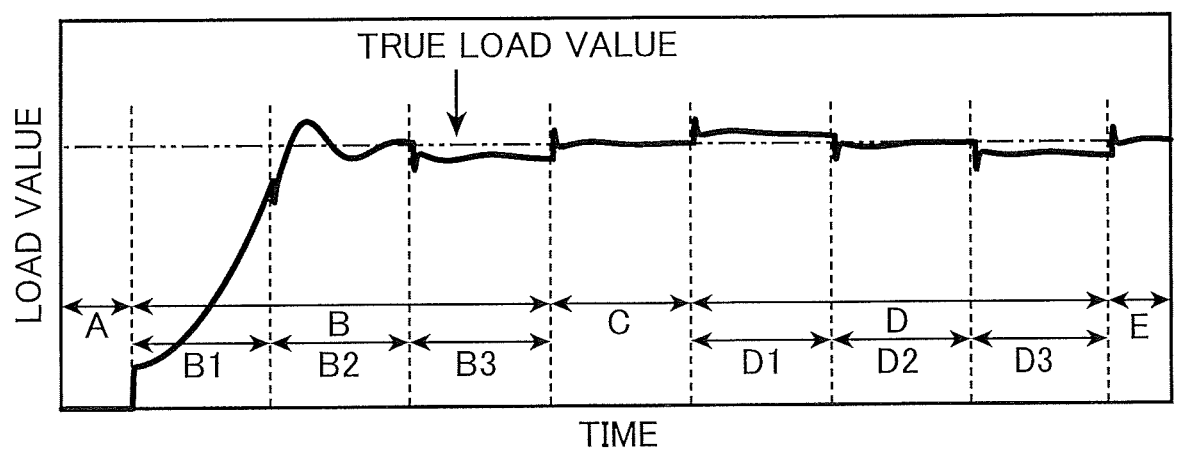
FIG. 10 is a graph showing a load value of a hanging cargo, the load value being calculated using a method of the second embodiment, in the simulation shown in FIG. 4.

FIG. 9 is a graph showing a rotation speed of the motor 13 in the simulation shown in FIG. 4, and what is shown is identical to that in FIG. 5. FIG. 10 is a graph showing a load value of the hanging cargo 17, the load value being calculated using the method of the second embodiment in the simulation shown in FIG. 4, and a vertical axis represents a load value while a horizontal value represents a time.

As shown in FIG. 10, it is found that a decrease of a load value with respect to a true value as observed in the deceleration periods B3 and D3 in FIG. 6 is eliminated, and that a load value becomes closer to a true value. Also, it is found that an increase of a load value with respect to a true value as observed in the acceleration period D1 in FIG. 6 is eliminated, and that a load value becomes closer to a true value.

(Modification of the Second Embodiment)

It is noted that even in a case where hoisting or lowering is performed at a constant speed, the estimated output torque value $T_q$ of the motor 13 may probably increase due to viscosity loss which depends on a rotation speed of the motor 13 and is produced due to mechanical loss of the winding apparatus 1.

To cope with such a case, the load estimation unit 152 can obtain a detected rotation speed value of the motor 13 from the power converter 14, calculate a second fluctuation amount of the estimated output torque value $T_q$, that is, an amount of fluctuation caused due to viscosity loss which depends on a detected rotation speed value, based on the detected rotation speed value which is obtained, and correct the estimated output torque value $T_q$ such that the first fluctuation amount and the second fluctuation amount are compensated for.

More specifically, the load estimation unit 152 can calculate a load value of the hanging cargo 17 using a formula (4)-b' in place of the formula (4)-b.

[Formula 5]

$$J\frac{d^2\theta}{dt^2} + c\frac{d\theta}{dt} = T_q - \frac{mR}{nk}\left(\frac{R}{nk}\frac{d^2\theta}{dt^2} + g\right) \quad (4)\text{-a}'$$

$$m = \frac{T_q - J\frac{d^2\theta}{dt^2} - c\frac{d\theta}{dt}}{\frac{R}{nk}\left(\frac{R}{nk}\frac{d^2\theta}{dt^2} + g\right)} \quad (4)\text{-b}'$$

Variables in the formulae (4)-a' and (4)-b' are as follows.

$T_q$: an estimated output torque value, J: a synthetic value of moments of inertia of the winch drum 11, the motor 13, and the speed reducer 12, k: the winding number, n: a speed reduction ratio; R: an effective radius of a winch drum, g: gravitational acceleration, θ: a detected rotation angle value, m: a load value (mass) of the hanging cargo 17, and c: a synthetic value of viscosity coefficients of the winding apparatus 1.

The formula (4)-b' is derived from an equation of motion represented by the formula (4)-a'. The second term c·dθ/dt of the left side in the formula (4)-a' corresponds to the second fluctuation amount and is proportional to a detected rotation speed value.

In a case where viscosity loss is considered, at a time of hoisting, a value of a current supplied to the motor 13 increases, which results in an increase of $I_q$ and $I_d$ in the formula (1) and an increase of the estimated output torque value $T_q$, so that a load value of the hanging cargo 17 is calculated to be higher than a true value. On the other hand, at a time of lowering, a value of a current supplied to the motor 13 decreases, which results in a decrease of $I_q$ and $I_d$ in the formula (1) and a decrease of the estimated output torque value $T_q$, so that a load value of the hanging cargo 17 is calculated to be lower than a true value.

In this regard, the second term c·dθ/dt of the left side becomes positive at a time of hoisting while becoming negative at a time of lowering, for example. Accordingly, as represented by the formula (4)-b', c·dθ/dt acts so as to decrease the estimated output torque value $T_q$ at a time of hoisting while acting so as to increase the estimated output torque value $T_q$ at a time of lowering, so that a load value of the hanging cargo 17 can be accurately calculated.

Figure 8:
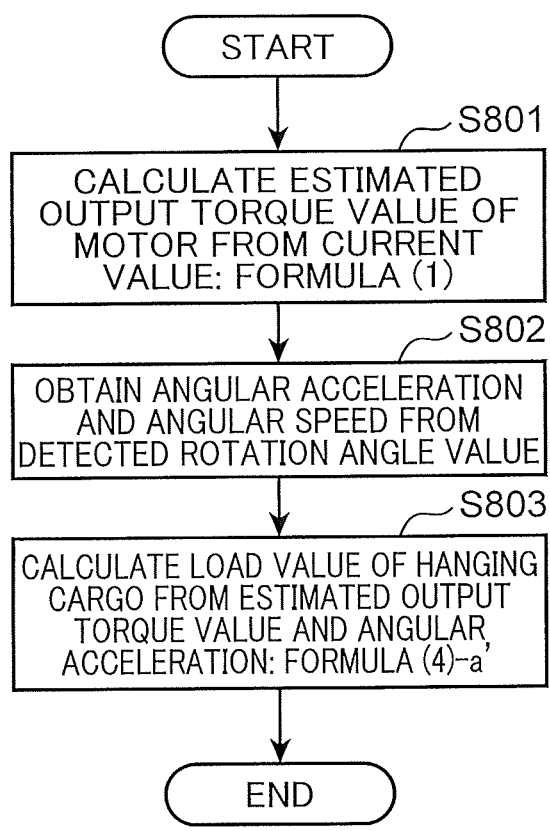
FIG. 8 is a flowchart showing another example of a process performed by the winding apparatus according to the second embodiment of the present invention.

FIG. 8 is a flowchart showing an example of a process performed by the winding apparatus 1 according to the second embodiment of the present invention.

A step S801 is identical to the step S701 in FIG. 7.

In a step S802, the load estimation unit 152 calculates angular speed by differentiation of the detected rotation angle value θ which is obtained from the power converter 14, and also calculates angular acceleration by second-order differentiation of the detected rotation angle value θ.

In a step S803, the load estimation unit 152 substitutes the estimated output torque value $T_q$ which is calculated in the step S801 and the angular acceleration which is calculated in the step S802 into the formula (4)-b', to calculate a load value of the hanging cargo 17.

In this manner, in the winding apparatus 1 according to the modification of the second embodiment, since the estimated output torque value $T_q$ is calculated with consideration of also the second fluctuation amount which is an amount of fluctuation caused due to viscosity loss of the winding apparatus 1 in the estimated output torque value $T_q$, the estimated output torque value $T_q$ can be corrected with high accuracy, so that a load value of the hanging cargo 17 can be accurately calculated.

Third Embodiment

While the formula (1) is used for calculating an estimated output torque value $T_q$ of a motor 13 in the first and second embodiments, q-axis inductance $L_q$ and flux linkage $\Psi_a$ which are characteristic parameters included in the formula (1) have characteristics that they non-linearly vary in accordance with a current value.

Accordingly, if a constant value is employed as each of the q-axis inductance $L_q$ and the flux linkage $\Psi_a$, there is caused divergence between the estimated output torque value $T_q$ and actual output torque of the motor 13, so that calculation accuracy of the estimated output torque value $T_q$ may probably be degraded and calculation accuracy of a load value of a hanging cargo 17 may probably be degraded.

Thus, in a third embodiment, when a current value which is obtained from a power converter 14 satisfies normal operating conditions, an output-torque estimation unit 151 calculates a characteristic parameter which depends on the obtained current value, and calculates the estimated output torque value $T_q$ using the calculated characteristic parameter. The normal operating conditions are that a varying amount of a current value obtained from the power converter 14 is smaller than a predetermined reference varying amount. It is noted that, as a predetermined reference varying amount, a value corresponding to a maximum current-value varying amount that allows accurate calculation of a characteristic parameter, can be employed, for example.

In the present embodiment, a permanent-magnet synchronous motor is employed as the motor 13. Out of characteristic parameters of the motor 13, the flux linkage $\Psi_a$ and the q-axis inductance $L_q$ are characteristic parameters which fluctuate considerably in accordance with a current value. Below, a method of estimating those two characteristic parameters will be described.

First, a voltage equation of the motor 13 is as represented by a formula (5).

[Formula 6]

$$\begin{bmatrix} v_d \\ v_q \end{bmatrix} = \begin{bmatrix} R_a & 0 \\ 0 & R_a \end{bmatrix}\begin{bmatrix} i_d \\ i_q \end{bmatrix} + \begin{bmatrix} L_d & 0 \\ 0 & L_q \end{bmatrix}\begin{bmatrix} \frac{di_d}{dt} \\ \frac{di_q}{dt} \end{bmatrix} + \\ \frac{d\theta}{dt}\begin{bmatrix} 0 & -L_q \\ L_d & 0 \end{bmatrix}\begin{bmatrix} i_d \\ i_q \end{bmatrix} + \begin{bmatrix} 0 \\ \frac{d\theta}{dt}\Psi_a \end{bmatrix} \quad (5)$$

Variables in the formula (5) are as follows.

$v_d$: a command d-axis voltage value, $v_q$: a command q-axis voltage value, $R_a$: coil resistance, $i_d$: a d-axis current, $i_q$: a q-axis current, θ: a detected rotation angle value, $\Psi_a$: flux linkage of an armature including a permanent magnet, $L_d$: d-axis inductance, and $L_q$: q-axis inductance.

It is noted that the d-axis current $i_d$ is identical to a detected d-axis current value $I_d$, and the q-axis current $i_q$ is identical to a detected q-axis current value $I_q$.

If variation in a current value is sufficiently small, it is permissible to ignore derivatives of the d-axis current $i_d$ and the q-axis current $i_q$ at the second term of the right side. In a case where a surface-permanent-magnet synchronous motor (SPMSM) is employed as the motor 13, a desired d-axis current value $I_{d\_ref}$ is set to zero in order to minimize a d-axis current which does not contribute to torque. In this case, the d-axis current $i_d$ can be treated as zero. Then, by solving the voltage equation of the command d-axis voltage value $v_d$ with respect to the q-axis inductance $L_q$ while ignoring the foregoing derivative terms and treating the d-axis current $i_d$ as zero, it is possible to obtain the following formula (6), and by solving the voltage equation of the command q-axis voltage value $v_q$ with respect to the flux linkage $T_a$, it is possible to obtain the following formula (7).

[Formula 7]

$$L_q = \frac{R_a i_d - v_d}{\frac{d\theta}{dt} i_q} \quad (6)$$

$$\Psi_a = \frac{v_q - R_a i_q}{\frac{d\theta}{dt}} \quad (7)$$

Variables in the formulae (6) and (7) are as follows.

$v_d$: a command d-axis voltage value, $v_q$: a command q-axis voltage value, $R_a$: coil resistance, $i_d$: a d-axis current, $i_q$: a q-axis current, θ: a detected rotation angle value, $\Psi_a$: flux linkage of an armature including a permanent magnet, $L_d$: d-axis inductance, and $L_q$: q-axis inductance.

Then, when a current value satisfies the normal operating conditions, the output-torque estimation unit 151 performs calculations in the above formulae (6) and (7) using the d-axis current $i_d$, the q-axis current $i_q$, the command d-axis voltage value $v_d$, the command q-axis voltage value $v_q$, and the detected rotation angle value θ of the motor 13 as actual driving data of the motor 13, to calculate the q-axis inductance $L_q$ and the flux linkage $\Psi_a$ which are characteristic parameters.

Thereafter, when a current value satisfies the normal operating conditions, the output-torque estimation unit 151 repeatedly performs a process of calculating a characteristic parameter from the driving data while changing a load value of the hanging cargo 17 at a constant desired speed, to generate correspondence information which indicates correspondence between a current value and a characteristic parameter.

Only when a current value satisfies the normal operating conditions, a characteristic parameter of the motor 13 is estimated by using the above formulae (6) and (7), so that a characteristic parameter can be easily calculated. Also, by changing a current value, it is possible to put characteristic parameters which depend on a current value, into a data form.

Figure 15:
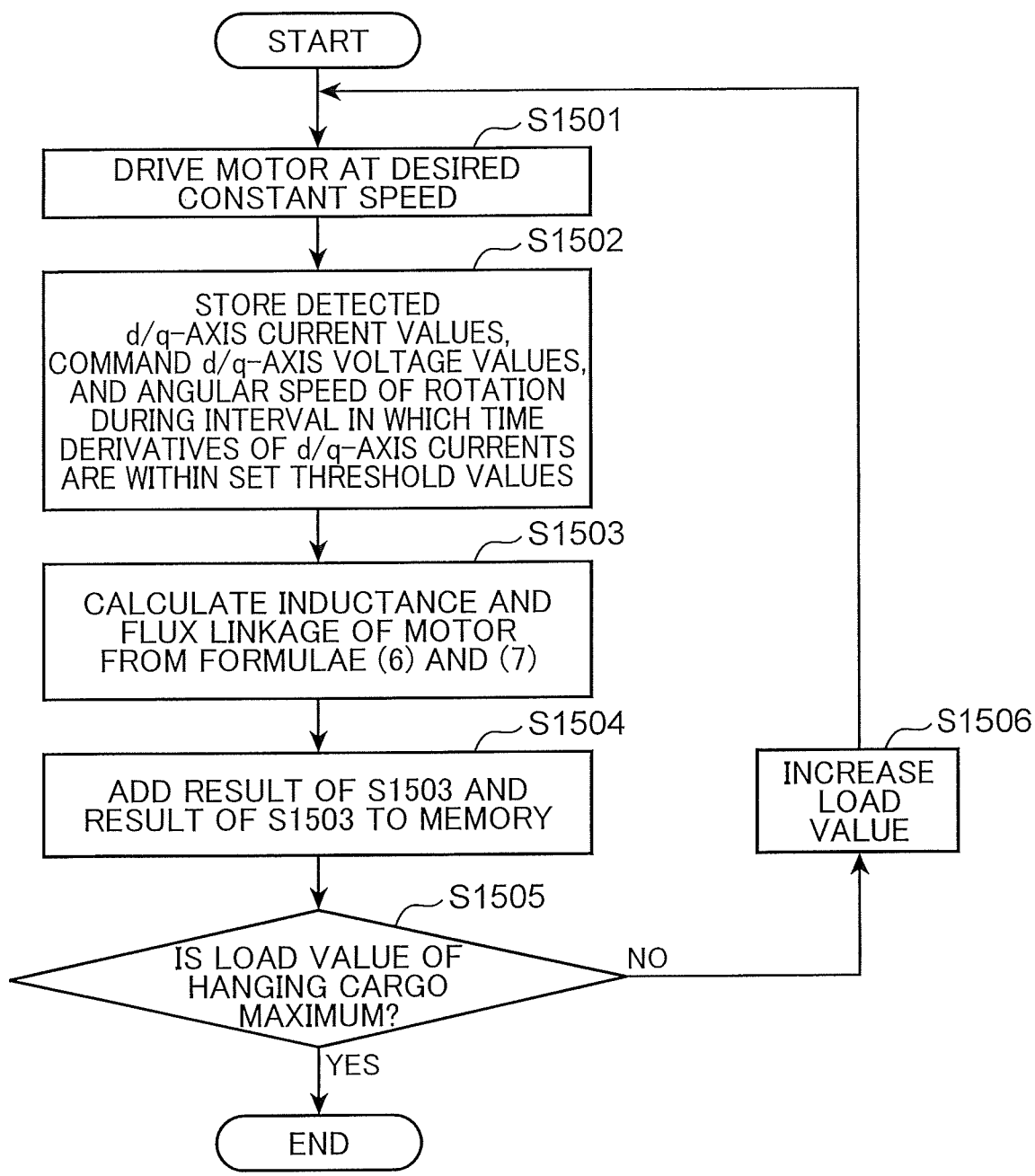
FIG. 15 is a flowchart showing an example of a process for generating correspondence information.

FIG. 15 is a flowchart showing an example of a process for generating correspondence information. Assume that the hanging cargo 17 having a default load value is hung on the wire rope 16 before steps in the flowchart are performed. It is noted that a default load value means a minimum load value out of load values of a plurality of hanging cargos 17 which are used in a process for generating correspondence information and have different load values.

[Step S1501]

The output-torque estimation unit 151 sets a desired speed, and drives the power converter 14 at the desired speed which is set. It is noted that as a desired speed, a speed which is preferable in generating correspondence information and is previously set can be employed.

[Step S1502]

The output-torque estimation unit 151 detects that a time derivative of the detected d-axis current value $I_d$ and a time derivative of the detected q-axis current value $I_q$ are within threshold values. Then, the output-torque estimation unit 151 stores driving data including the detected d-axis current value $I_d$, the detected q-axis current value $I_q$, the command d-axis voltage value $v_d$, the command q-axis voltage value $v_q$, and an angular speed of rotation of the motor 13, into a memory not shown.

[Step S1503]

The output-torque estimation unit 151 substitutes the driving data (the detected d-axis current value $I_d$, the detected q-axis current value $I_q$, the command d-axis voltage value $v_d$, the command q-axis voltage value $v_q$, and a rotation speed of the motor 13) stored in the step S1502 into the formulae (6) and (7), to calculate the q-axis inductance $L_q$ and the flux linkage $\Psi_a$.

[Step S1504]

The output-torque estimation unit 151 stores the q-axis inductance $L_q$ and the flux linkage $\Psi_a$ which are calculated in the step S1503 into the memory while associating them with the driving data stored in the step S1502. As a result of this, one set of data in which the driving data and characteristic parameters are associated with each other is added to correspondence information.

[Step S1505]

The output-torque estimation unit 151 increases a load value of the hanging cargo 17 (step S1506) if a load value of the hanging cargo 17 which is being hung at present is not a maximum load value of the hanging cargo 17 ("NO" in step S1505). Here, the hanging cargo 17 having a next larger load value with respect to the hanging cargo 17 being hung at present is hung on the wire rope 16 by an operator, so that a load value of the hanging cargo 17 is increased.

On the other hand, the output-torque estimation unit 151 finishes the process if a load value of the hanging cargo 17 being hung at present is the maximum load value of the hanging cargo 17 ("YES" in step S1505).

Additionally, in actually calculating the estimated output torque value $T_q$, the output-torque estimation unit 151 calculates the q-axis inductance $L_q$ and the flux linkage $\Psi_a$ by obtaining the driving data being provided at present and substituting the obtained driving data into the formulae (6) and (7). Then, the output-torque estimation unit 151 can calculate the estimated output torque value $T_q$ by substituting the q-axis inductance $L_q$ and the flux linkage $\Psi_a$ which are calculated, into the formula (1).

As a consequence, the estimated output torque value $T_q$ can be calculated using the q-axis inductance $L_q$ and the flux linkage $\Psi_a$ which conform to driving conditions of the motor 13.

Additionally, a process for generating correspondence information can be performed at a time of initial adjustment before factory shipment, for example. However, such timing is one example, and the output-torque estimation unit 151 may generate correspondence information by appropriately extracting driving data during an interval in which variation in a current value is small, at a time of actually hoisting or lowering the hanging cargo 17.

Figure 11:
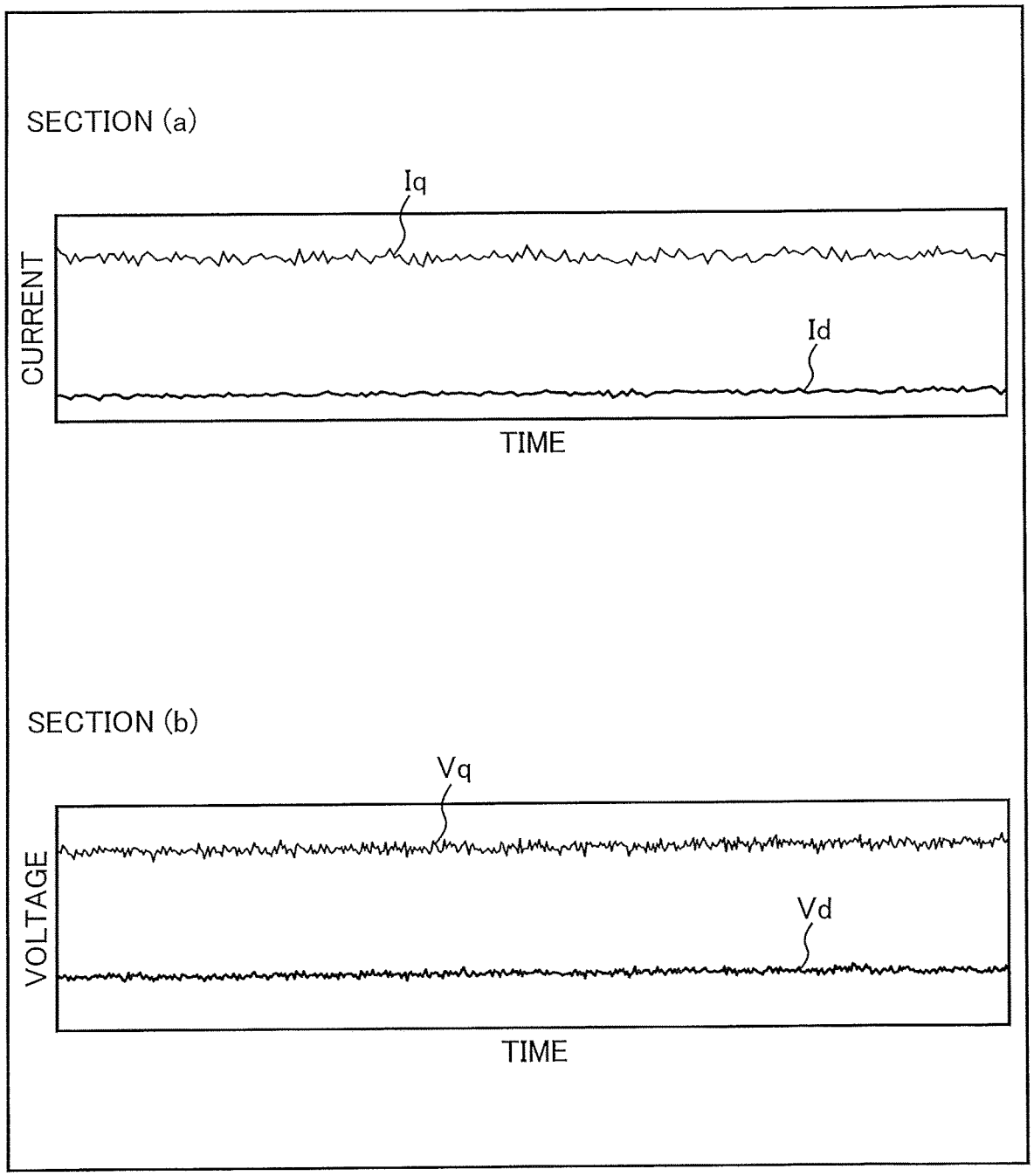
FIG. 11 includes a graph at Section (a) which shows an example of time-series data of a detected q-axis current value and a detected d-axis current value under the condition that variation in a current value is sufficiently small, and a graph at Section (b) which shows an example of time-series data of a command q-axis voltage value and a command d-axis voltage value under the condition that variation in a current value is sufficiently small.

Section (a) of FIG. 11 includes a graph showing one example of time-series data of the detected q-axis current value $I_q$ and the detected d-axis current value $I_d$, the time-series data being provided when a current value satisfies the normal operating conditions, and a vertical axis represents a current while a horizontal axis represents a time. Section (b) in FIG. 11 includes a graph showing one example of time-series data of the command q-axis voltage value $v_q$ and the command d-axis voltage value $v_d$, the time-series data being provided when a current value satisfies the normal operating conditions, and a vertical axis represents a voltage while a horizontal axis represents a time.

Section (a) of FIG. 11 shows an example in which variation in each of the detected q-axis current value $I_q$ and the detected d-axis current value $I_d$ is small and the normal operating conditions are satisfied. Accordingly, as shown in Section (b) of FIG. 11, also variation in the command q-axis voltage value $v_q$ and the command d-axis voltage value $v_d$ is small, and the normal operating conditions are satisfied. Additionally, although the detected q-axis current value $I_q$ and the detected d-axis current value $I_d$ fluctuate to some degree under the influence of a high-frequency noise in Section (a) of FIG. 11, it is found that those current values are kept substantially constant on the whole.

In this manner, when the detected q-axis current value $I_q$ and the detected d-axis current value $I_d$ satisfy the normal operating conditions, each of a derivative of the detected q-axis current value $I_q$ (the q-axis current $i_q$) and a derivative of the detected d-axis current value (the d-axis current $i_d$), which are shown in the right term in the formula (5), is small enough to ignore as described above. Also, in a case where control is exercised such that the desired d-axis current value $I_{d\_}$ref is equal to zero, the detected d-axis current value (the d-axis current $i_d$) can be treated as zero. Then, the output-torque estimation unit 151 substitutes a command q-axis current value and a command d-axis current value, together with the command q-axis voltage value $v_q$ and the command d-axis voltage value $v_d$ which are calculated simultaneously with the foregoing command current values, and the detected rotation angle value θ, into the formulae (6) and (7), to calculate the flux linkage $\Psi_a$ and the q-axis inductance $L_q$.

In this regard, the reasons for using driving data provided when the detected q-axis current value $I_q$ and the detected d-axis current value $I_d$ satisfy the normal operating conditions are that a process cost for calculating a derivative of each of the detected q-axis current value $I_q$ and the detected d-axis current value $I_d$ with high accuracy is excessively high.

Then, the output-torque estimation unit 151 repeatedly performs a process of calculating the flux linkage $\Psi_a$ and the q-axis inductance $L_q$ while changing a load value of the hanging cargo 17, to thereby generate inductance correspondence information which indicates a relationship between the q-axis inductance $L_q$ and the detected q-axis current value $I_q$, and generate flux-linkage correspondence information which indicates a relationship between the flux linkage and the detected q-axis current value $I_q$.

Figure 12:
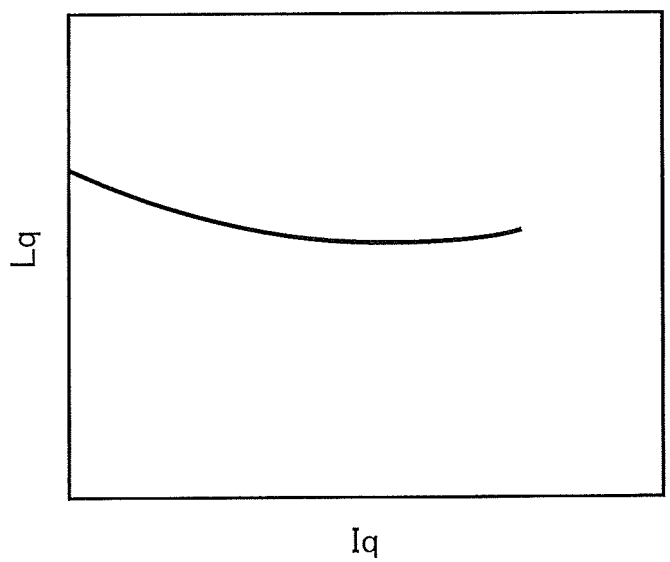
FIG. 12 includes a graph at Section (a) showing inductance correspondence information and a graph at Section (b) showing flux-linkage correspondence information.
Figure 12:
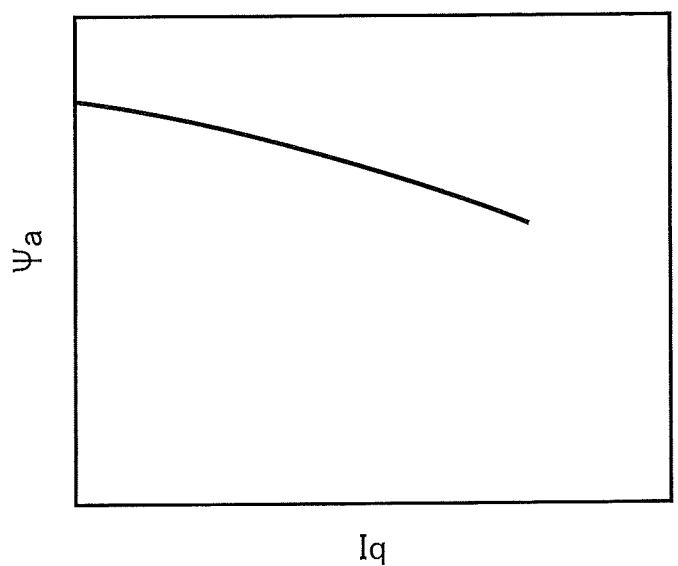

Section (a) of FIG. 12 includes a graph showing inductance correspondence information, and a vertical axis represents the q-axis inductance $L_q$ while a horizontal axis represents the detected q-axis current value $I_q$. Section (b) of FIG. 12 includes a graph showing flux-linkage correspondence information, and a vertical axis represents the flux linkage $\Psi_a$ while a horizontal axis represents the detected q-axis current value $I_q$.

In an example at Section (a) of FIG. 12, for inductance correspondence information, as the detected q-axis current value $I_q$ increases, the q-axis inductance $L_q$ varies in a slight curve protruding downward, and it is found that the q-axis inductance $L_q$ varies in accordance with the detected q-axis current value Also, in an example at Section (b) of FIG. 12, for flux-linkage correspondence information, as the detected q-axis current value $I_q$ increases, the flux linkage $\Psi_a$ monotonously decreases, and it is found that the flux linkage $\Psi_a$ varies in accordance with the detected q-axis current value $I_q$.

Figure 13:
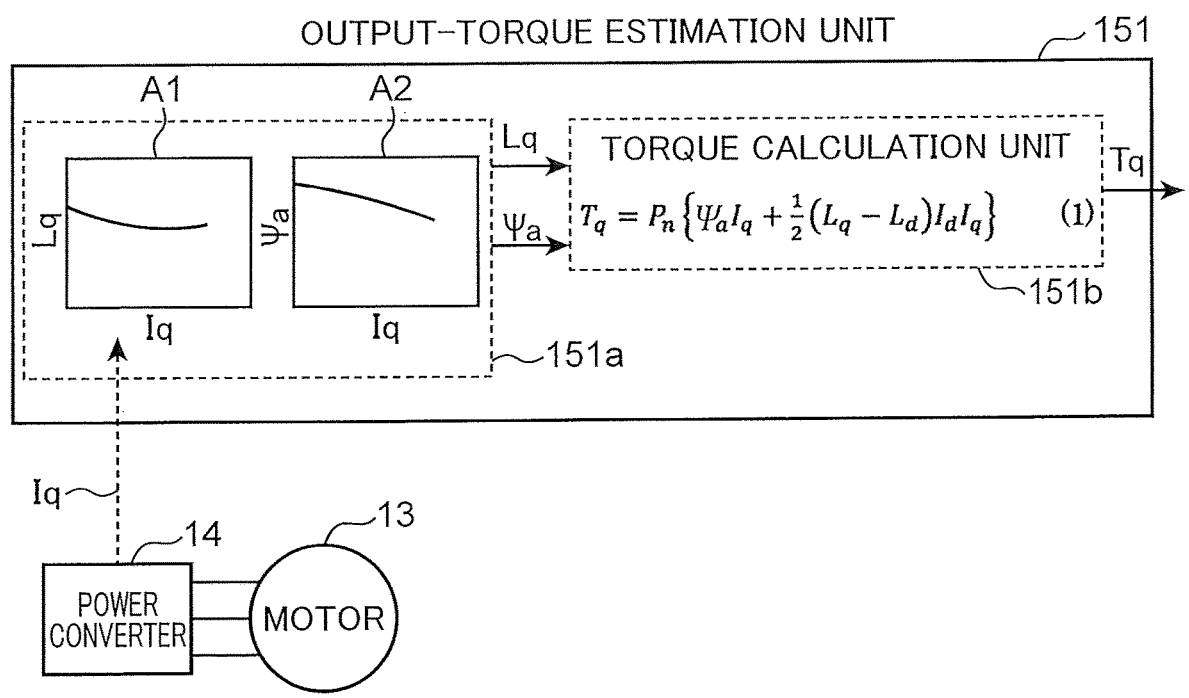
FIG. 13 is a view showing a specific configuration of an output-torque estimation unit.

FIG. 13 is a view showing a specific configuration of the output-torque estimation unit 151. As shown in FIG. 13, the output-torque estimation unit 151 includes a memory 151a and a torque calculation unit 151b. In the memory 151a, inductance correspondence information A1 and flux-linkage correspondence information A2 are previously stored.

The torque calculation unit 151b obtains the detected q-axis current value $I_q$ being provided at present, from the power converter 14, and determines the q-axis inductance $L_q$ and the flux linkage $\Psi_a$ which correspond to the detected q-axis current value $I_q$ which is obtained, by referring to the inductance correspondence information A1 and the flux-linkage correspondence information A2, respectively, which are stored in the memory 151a. Then, the torque calculation unit 151b substitutes the q-axis inductance $L_q$ and the flux linkage $\Psi_a$ which are determined, into the formula (1) and also substitutes the detected d-axis current value $I_d$ and the detected q-axis current value $I_q$ which are obtained from the power converter 14, into the formula (1), to thereby calculate the estimated output torque value $T_q$ As a consequence, the output-torque estimation unit 151 can calculate the estimated output torque value $T_q$ with high accuracy while considering the q-axis inductance $L_q$ and the flux linkage $\Psi_a$ which are actually provided.

Figure 14:
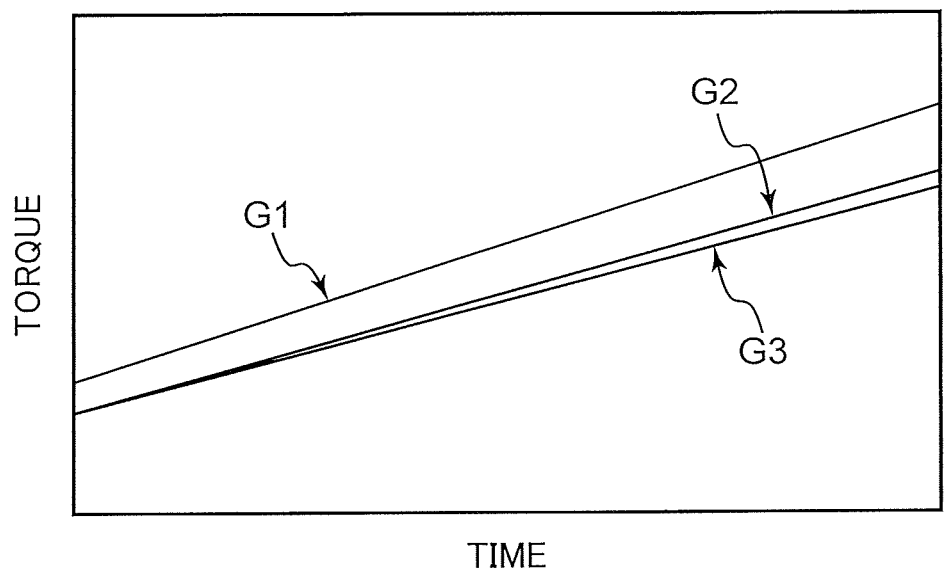
FIG. 14 is a graph showing a result of simulation which is carried out for calculating an estimated output torque value, with torque of a motor being increased in a ramp form by an increase of a current supplied to the motor while the motor is being driven at a constant rotation speed.

FIG. 14 is a graph showing a result of simulation which is carried out for calculating the estimated output torque value $T_q$, with torque of the motor 13 being increased in a ramp form by an increase of a current supplied to the motor 13 while the motor 13 is being driven at a desired constant speed. In FIG. 14, a vertical axis represents torque, and a horizontal axis represents a time.

In FIG. 14, a graph G1 shows the estimated output torque value $T_q$ which is provided when the q-axis inductance $L_q$ and the flux linkage $\Psi_a$ are made constant. A graph G2 shows the estimated output torque value $T_q$ which is provided using the q-axis inductance $L_q$ and the flux linkage $\Psi_a$ which are determined using the inductance correspondence information A1 and the flux-linkage correspondence information A2. A graph G3 is a graph showing a true value of output torque of the motor 13.

As shown by the graph G1, in a case where the q-axis inductance $L_q$ and the flux linkage $\Psi_a$ are made constant, the estimated output torque value $T_q$ as a whole deviates upward relative to a true value of output torque shown by the graph G3, which indicates that an error with respect to a true value is large. In contrast thereto, as shown by the graph G2, with regard to the estimated output torque value $T_q$ which is provided using the q-axis inductance $L_q$ and the flux linkage $\Psi_a$ which are determined using the inductance correspondence information A1 and the flux-linkage correspondence information A2, an error thereof with respect to a true value is significantly reduced, which indicates that the estimated output torque value $T_q$ is calculated with high accuracy.

Additionally, although the q-axis inductance $L_q$ and the flux linkage $\Psi_a$ are employed as characteristic parameters in the third embodiment, characteristic parameters are not limited to those and the other characteristic parameters of the motor 13 may be employed. For example, the d-axis inductance $L_d$ may be employed as a characteristic parameter.

Also, although a characteristic parameter for actual driving data is calculated using correspondence information which is previously generated in the third embodiment, a way of calculation is not limited to that. For example, the output-torque estimation unit 151 may calculate a characteristic parameter using the formulae (6) and (7) every time actual driving data is obtained, and calculate the estimated output torque value $T_q$ using the calculated characteristic parameter.

Fourth Embodiment

In a winding apparatus 1 for a crane according to a fourth embodiment, a corrected current value is calculated by subtraction of an iron-loss current which does not contribute to torque of a motor 13 from a value of a current supplied to the motor 13, and an estimated output torque value $T_q$ is calculated using the corrected current value which is calculated. It is noted that, in the present embodiment, the same composing elements as in the first to third embodiments will be denoted by the same reference numerals, and description thereof will be omitted.

Figure 16:
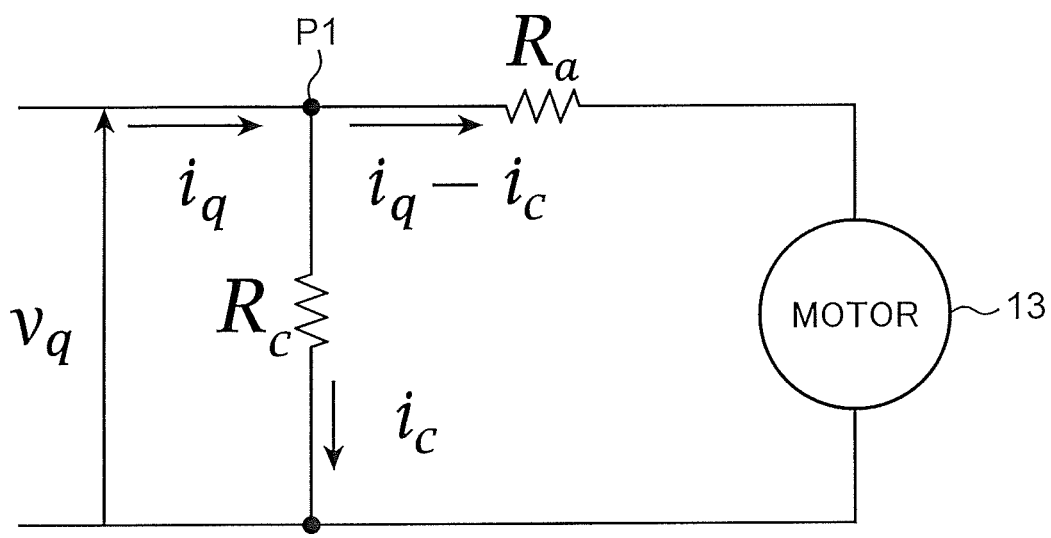
FIG. 16 is a view showing an equivalent circuit of a motor in which iron loss is considered.

FIG. 16 is a view showing an equivalent circuit 1600 of the motor 13 in which iron loss is considered. In the fourth embodiment, a power converter 14 controls the motor 13 while setting a desired d-axis current value $I_{d\_ref}$ to zero so that a d-axis current $i_d$ which does not contribute to torque vanishes. To this end, the equivalent circuit 1600 is modelled with the d-axis current $i_d$ supplied to the motor 13 being set to zero.

The equivalent circuit 1600 includes iron-loss resistance $R_c$, coil resistance $R_a$, and the motor 13. In the equivalent circuit 1600, the iron-loss resistance $R_c$ is connected in parallel to a series circuit of the coil resistance $R_a$ and the motor 13.

A command q-axis voltage value $v_q$ is applied to the iron-loss resistance $R_e$. A q-axis current $i_q$ is input to a junction P1 of the iron-loss resistance $R_c$ and the coil resistance $R_a$. When an iron-loss current flowing through the iron-loss resistance $R_c$ is denoted by "$i_c$", a current of $i_q-1_e$ flows through the coil resistance $R_a$.

The iron-loss current $i_c$ is not supplied to the motor 13, and so does not contribute to torque. Then, in the present embodiment, the iron-loss current $i_c$ is obtained from the equivalent circuit 1600 and the obtained iron-loss current $i_c$ is subtracted from the q-axis current $i_q$, so that the iron-loss current $i_c$ is separated from the q-axis current $i_q$.

From the equivalent circuit 1600, a loss equation represented by a formula (8) is obtained. The loss equation is an equation for expressing loss $W_{loss}$ which includes a sum of iron loss and copper loss of the motor 13, using the coil resistance $R_a$, the q-axis current $i_q$, the iron-loss current $i_c$, and the command q-axis voltage value $v_q$.

[Formula 8]

$$W_{loss}=R_a(i_q-i_c)^2+v_q i_c \qquad (8)$$

In the formula (8), the first term of the right side represents copper loss and the second term of the right side represents iron loss. Copper loss is expressed using the coil resistance $R_a$ which is previously determined and a difference between the q-axis current $i_q$ and the iron-loss current $i_c$. Iron loss is expressed using the command q-axis voltage value $v_q$ and the iron-loss current $i_c$.

To solve the formula (8) with respect to $i_c$ would obtain the following formula (9).

[Formula 9]

$$i_c = \frac{-(v_q - 2R_a i_q) + \sqrt{(v_q - 2R_a i_q)^2 - 4R_a(R_a i_q^2 - W_{loss})}}{2R_a} \qquad (9)$$

Variables in the formulae (8) and (9) are as follows.

$R_a$: coil resistance, $i_q$: a q-axis current, $i_c$: iron-loss current, $v_q$: a command q-axis voltage value, and $W_{loss}$: loss of the motor 13.

In the formula (9), a value which is calculated in a current controller 144 of the power converter 14 can be employed as the command q-axis voltage value $v_q$, and a detected q-axis current value $I_q$ which is calculated in a uvw-to-dq converter 146 of the power converter 14 can be employed as the q-axis current. While the loss $W_{loss}$ is unknown, the loss $W_{loss}$ can be obtained from the following formula (10) if an efficiency $\eta$ of the motor 13 is known.

[Formula 10]

$$W_{loss}=(v_d i_d+v_q i_q)(1-\eta) \qquad (10)$$

Figure 18:
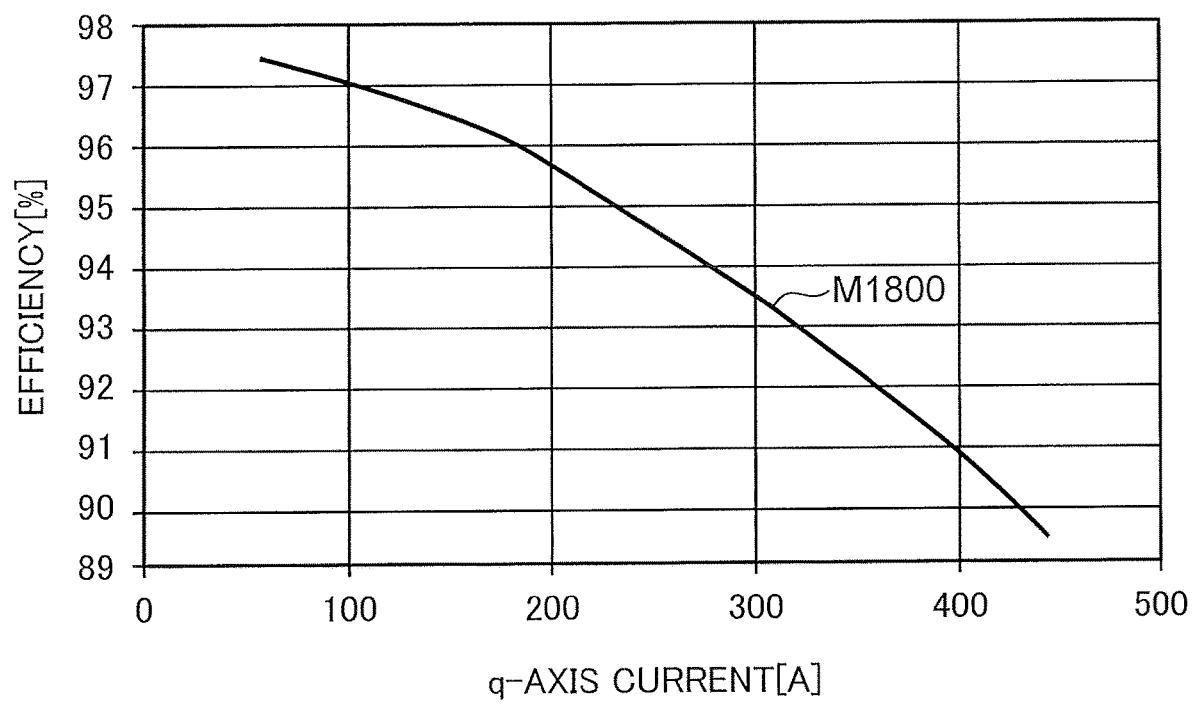
FIG. 18 is a graph showing an example of an efficiency map M1800.

In this regard, the efficiency $\eta$ is determined using an efficiency map M1800 which previously indicates a relationship between the q-axis current $i_q$ and the efficiency $\eta$ and is shown in FIG. 18. FIG. 18 is a graph showing one example of the efficiency map M1800. In FIG. 18, a vertical axis represents the efficiency $\eta$ (%), and a horizontal axis represents the q-axis current. In the example in FIG. 18, the efficiency map M1800 has a characteristic that the efficiency $\eta$ monotonously decreases as the q-axis current increases. The efficiency map M1800 is prepared by actual measurement or simulation of the efficiency $\eta$ with the use of the q-axis current $i_q$ being changed, and is stored in a memory. The efficiency map M1800 may be stored in a memory in a form of a function in which the q-axis current serves as an input and the efficiency $\eta$ serves as an output, or may be stored in a memory in a form of a lookup table.

In the formula (10), a value which is calculated in a current controller 143 of the power converter 14 can be employed as a command d-axis voltage value $v_d$. A value which is calculated in the current controller 144 of the power converter 14 can be employed as the command q-axis voltage value $v_q$. A detected d-axis current value $I_d$ which is calculated in the uvw-to-dq converter 146 of the power converter 14 can be employed as the d-axis current $i_d$. The detected q-axis current value $I_q$ which is calculated in the uvw-to-dq converter 146 of the power converter 14 can be employed as the q-axis current $i_q$. A value which is obtained by referring to the efficiency map M1800 can be employed as the efficiency $\eta$.

Accordingly, the iron-loss current $i_c$ can be calculated by substitution of the loss $W_{loss}$ which is obtained by the formula (10) into the formula (9). While the desired d-axis current value $I_{d\_ref}$ is set to zero in the present embodiment, the d-axis current $i_d$ flows in some cases. Hence, the loss $W_{loss}$ is calculated without ignoring the d-axis current $i_d$ in the formula (10) so that calculation accuracy of the loss $W_{loss}$ is enhanced. However, this is one example, and the loss $W_{loss}$ may be calculated in the formula (10) with the d-axis current $i_d$ being set to zero.

In the voltage equation represented by the above formula (5), if derivative terms of the d-axis current $i_d$ and the q-axis current $i_q$ at the second term of the right side are ignored and the d-axis current $i_d$ and the q-axis current $i_q$ are set to zero and $i_q$-$i_n$, respectively, the flux linkage $\Psi_a$ is obtained by the following formula (11).

[Formula 11]

$$\Psi_a' = \frac{v_q - R_a(i_q - i_c)}{\omega} \qquad (11)$$

It is noted that $\omega$ represents a detected rotation speed value of the motor 13, that is, a derivative $d\theta/dt$ of a detected rotation angle value $\theta$.

Accordingly, flux linkage $\Psi_a'$ can be calculated by substitution of the iron-loss current $i_c$ which is obtained by the formulae (8) and (9), into the formula (11).

Then, as the flux linkage $\Psi_a'$ is known, the estimated output torque value $T_q$ can be calculated using the following formula (12).

[Formula 12]

$$Tq=P_n\Psi_a'(i_q-i_c) \qquad (12)$$

It is noted that $P_n$ represents the number of pole pairs.

The formula (12) is a mathematical expression which is obtained in such a manner that the second term representing reluctance torque is ignored, $\Psi_a$ is replaced with $\Psi_a'$ in the mathematical expression at the first term representing magnet torque, and $i_q$ is replaced with $i_q$-$i_c$, in the above formula (1). In this regard, reluctance torque is ignored because the d-axis current $i_d$ is treated as zero.

Figure 17:
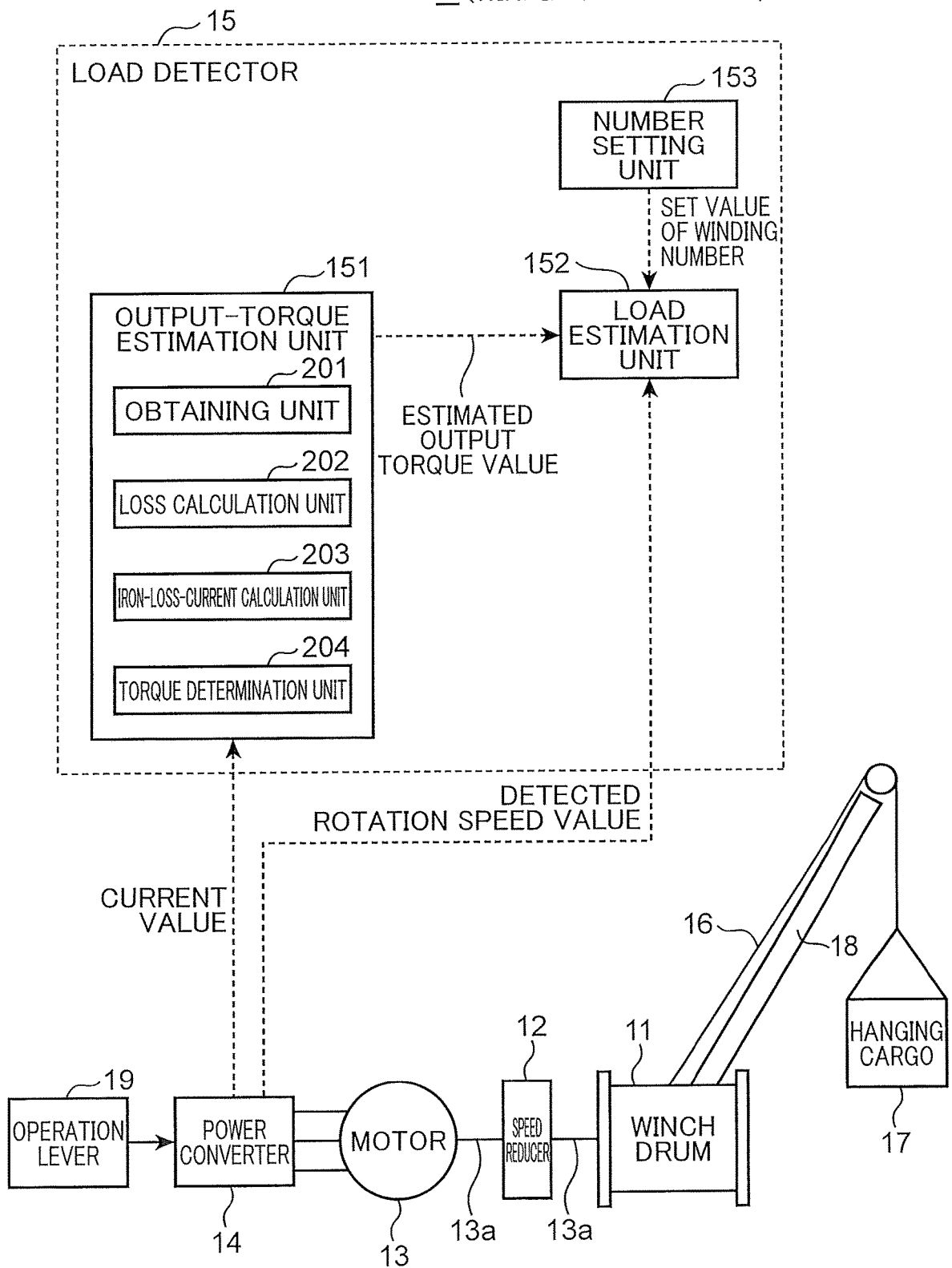
FIG. 17 is a block diagram showing a configuration of a winding apparatus for a crane according to a fourth embodiment of the present invention.

Next, a specific apparatus configuration according to the fourth embodiment will be described. FIG. 17 is a block diagram showing a configuration of the winding apparatus 1 for a crane according to the fourth embodiment of the present invention.

As shown in FIG. 17, the winding apparatus 1 for a crane according to the fourth embodiment is different from that in FIG. 1 in a configuration of an output-torque estimation unit 151.

The output-torque estimation unit 151 includes an obtaining unit 201, a loss calculation unit 202, an iron-loss-current calculation unit 203, and a torque determination unit 204.

The obtaining unit 201 obtains values of a current and a voltage which are supplied to the motor 13, and a rotation speed of the motor 13, from the power converter 14. In this regard, the obtaining unit 201 obtains the detected d-axis current value $I_d$ and the detected q-axis current value $I_q$ which are calculated in the uvw-to-dq converter 146, as a value of a current supplied to the motor 13. Also, the obtaining unit 201 obtains the command d-axis voltage value $v_d$ calculated in the current controller 143 and the command q-axis voltage value $v_q$ calculated in the current controller 144, as a value of a voltage supplied to the motor 13. Further, the obtaining unit 201 obtains the detected rotation speed value ω calculated in a speed calculation unit 148, as a rotation speed of the motor 13.

The loss calculation unit 202 refers to the efficiency map M1800, to determine the efficiency η for the detected q-axis current value $I_q$ which is obtained in the obtaining unit 201. Then, the loss calculation unit 202 calculates the loss $W_{loss}$ by substituting the detected d-axis current value $I_d$, the detected q-axis current value $I_q$, the command d-axis voltage value $v_d$, and the command q-axis voltage value $v_q$ which are obtained in the obtaining unit 201, as well as the determined efficiency η, into the formula (10). Additionally, the detected d-axis current value $I_d$ and the detected q-axis current value $I_q$ are assigned to the d-axis current $i_d$ and the q-axis current $i_q$, respectively.

The iron-loss-current calculation unit 203 calculates the iron-loss current $i_c$ by substituting the command q-axis voltage value $v_q$ and the detected q-axis current value $I_q$ which are obtained in the obtaining unit 201, as well as the loss $W_{loss}$, into the loss equation represented by the formula (9). Additionally, the detected q-axis current value $I_q$ is assigned to the q-axis current $i_q$.

The torque determination unit 204 subtracts the calculated iron-loss current $i_c$ from the detected q-axis current value $I_q$ which is obtained in the obtaining unit 201, to calculate a corrected current value $(i_q-i_c)$ which is equal to the q-axis current $i_q$ from which a current not contributing to torque is removed. Then, the torque determination unit 204 determines the estimated output torque value $T_q$ based on the corrected current value $(i_q-i_c)$.

More specifically, the torque determination unit 204 calculates the flux linkage $\Psi_a'$ by substituting the corrected current value $(i_q-i_c)$, as well as the detected rotation speed value co and the command q-axis voltage value $v_q$ which are obtained in the obtaining unit 201, into the formula (11).

Then, the torque determination unit 204 determines the estimated output torque value $T_q$ by substituting the calculated flux linkage $\Psi_a'$ and the corrected current value $(i_q-i_c)$ into the formula (12).

A load estimation unit 152 calculates a load value of the hanging cargo 17 using the estimated output torque value $T_q$ which is calculated by the torque determination unit 204. In this regard, the load estimation unit 152 may obtain a tension F by assigning the estimated output torque value $T_q$ which is calculated by the torque determination unit 204 to the estimated output torque value $T_q$ in the formula (2) described in the first embodiment, and substitute the obtained tension F into the formula (3), to calculate a load value of the hanging cargo 17. Also, the load estimation unit 152 may calculate a load value of the hanging cargo 17 by assigning the estimated output torque value $T_q$ which is calculated by the torque determination unit 204 to $T_q$ in the formula (4)-b described in the second embodiment or in the formula (4)-b' described in the modification of the second embodiment.

Figure 19:
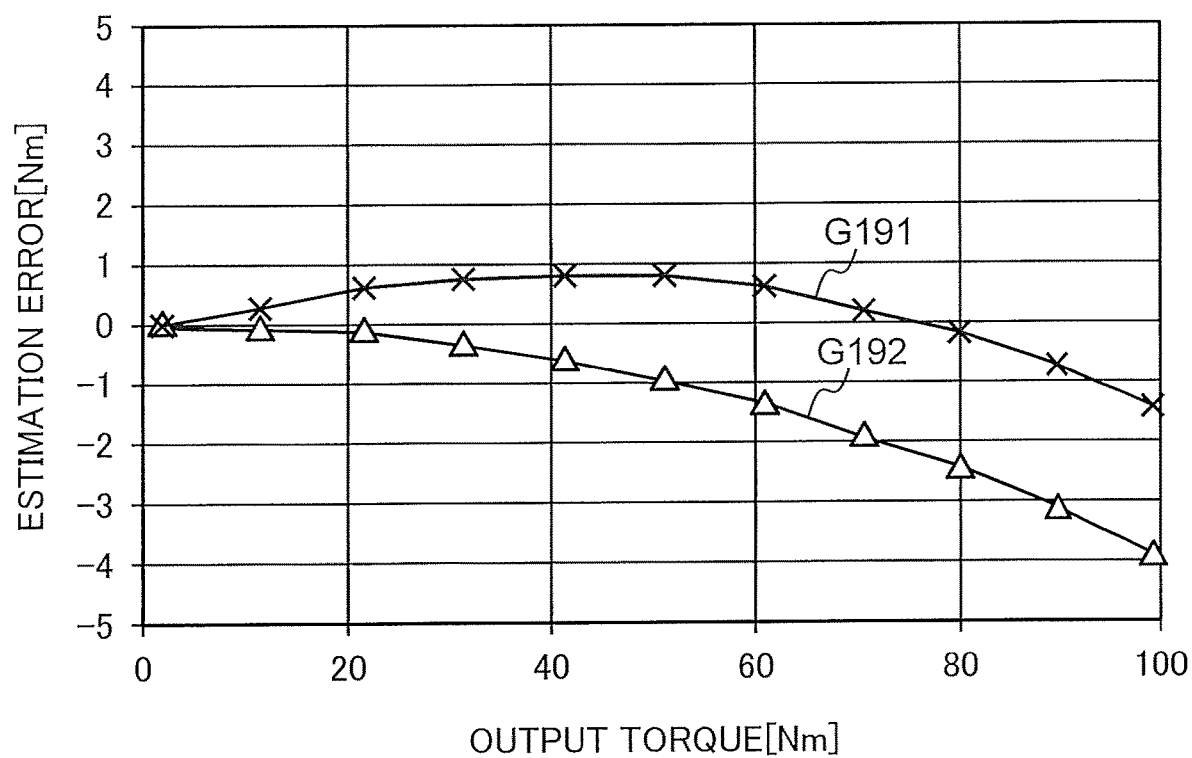
FIG. 19 is a graph including an error curve showing an estimation error between an estimated output torque value calculated in the fourth embodiment and a true value of output torque, and an error curve showing an estimation error between an estimated output torque value calculated in a comparative example and a true value of output torque.

FIG. 19 is a graph showing an error curve G191 indicating an estimation error between the estimated output torque value $T_q$ which is calculated in the fourth embodiment and a true value of output torque, and an error curve G192 indicating an estimation error between the estimated output torque value $T_q$ which is calculated in a comparative example and a true value of output torque. In FIG. 19, a vertical axis represents an estimation error [N·m], and a horizontal axis represents a true value of output torque. FIG. 19 indicates that the estimated output torque value $T_q$ becomes closer to a true value as an estimation error becomes closer to zero.

In the comparative example, the estimated output torque value $T_q$ is calculated without subtracting the iron-loss current $i_c$ from the q-axis current $i_q$. Accordingly, on the error curve G192 in the comparative example, an estimation error starts to become greater than an estimation error in the fourth embodiment, around a point where a true value of output torque exceeds 50 [N·m], which indicates that estimation accuracy is reduced.

As described above, according to the fourth embodiment, the estimated output torque value $T_q$ is calculated using the corrected current value $(i_q-i_c)$ which is equal to the q-axis current $i_q$ from which the iron-loss current $i_c$ which is a current component not contributing to torque is removed, so that estimation accuracy of the estimated output torque value $T_q$ can be improved. Also, since the efficiency η is determined using the efficiency map M1800, the efficiency η can be determined without provision of special equipment for obtaining the efficiency η.

[Modification of the Fourth Embodiment]

Figure 20:
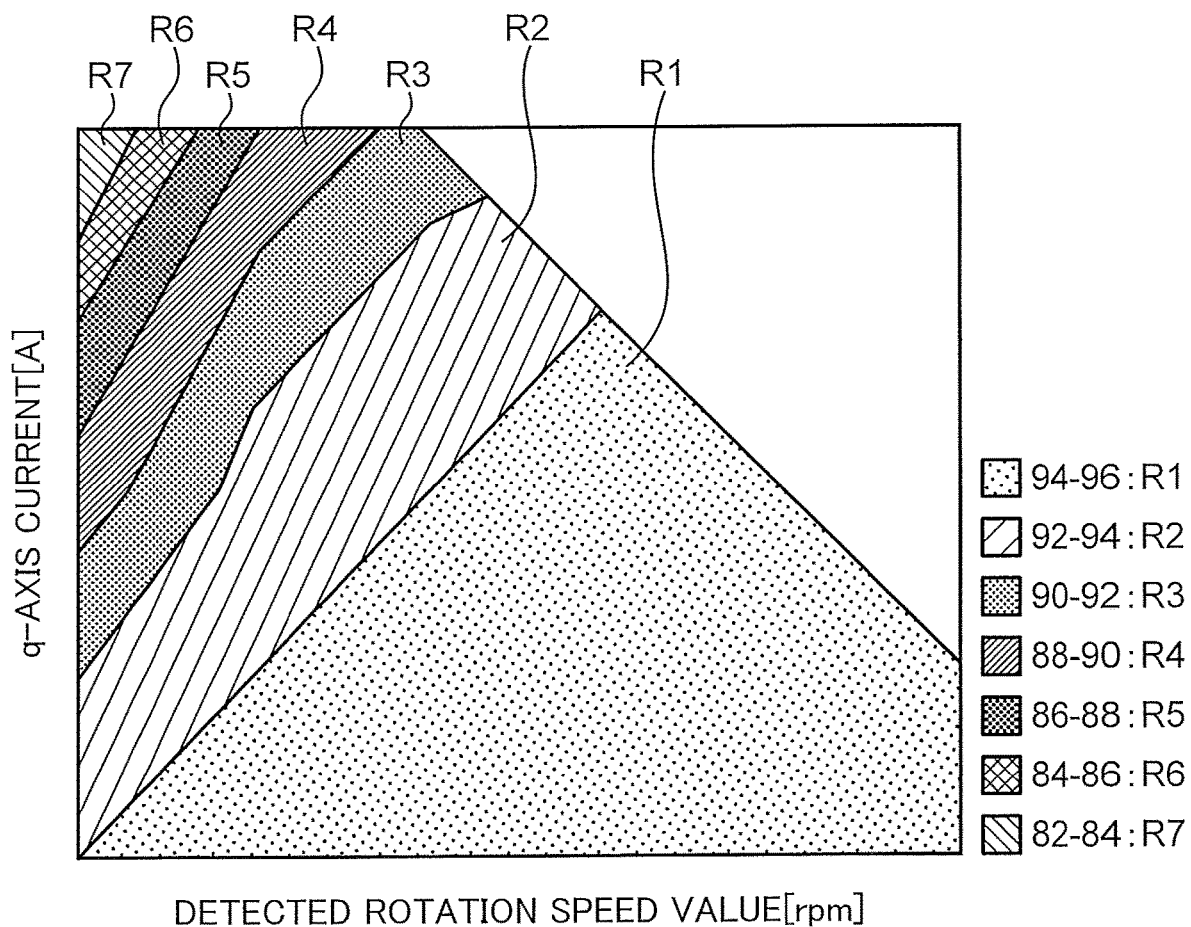
FIG. 20 is a graph showing an example of an efficiency map M1801 according to a modification of the fourth embodiment.

Although the efficiency η is determined using the efficiency map M1800 shown in FIG. 18 in the fourth embodiment, the efficiency η is determined using an efficiency map M1801 shown in FIG. 20 in a modification of the fourth embodiment.

FIG. 20 is a graph showing an example of the efficiency map M1801 according to the modification of the fourth embodiment. In FIG. 20, a vertical axis represents the q-axis current, and a horizontal axis represents the detected rotation speed value ω (rpm). In the efficiency map M1801, the efficiencies η for the q-axis current $i_q$ and the detected rotation speed value ω are stored. In an example of FIG. 20, the efficiencies η are stored in the efficiency map M1801 which is divided into seven regions R1 to R7. The region R1 is a region where the efficiencies η each of which is equal to or higher than 94 and lower than 96 are included, the region R2 is a region where the efficiencies η each of which is equal to or higher than 92 and lower than 94 are included, the region R3 is a region where the efficiencies η each of which is equal to or higher than 90 and lower than 92 are included, the region R4 is a region where the efficiencies η each of which is equal to or higher than 88 and lower than 90 are included, the region R5 is a region where the efficiencies η each of which is equal to or higher than 86 and lower than 88 are included, the region R6 is a region where the efficiencies η each of which is equal to or higher than 84 and lower than 86 are included, and the region R7 is a region where the efficiencies η each of which is equal to or higher than 82 and lower than 84 are included.

Thus, the loss calculation unit 202 judges to which region out of the regions R1 to R7 the detected q-axis current value $I_q$ and the detected rotation speed value ω which are obtained in the obtaining unit 201, belong, and determines the efficiency η in a region which is judged to be a region to which the obtained values belong, as the efficiency η used for calculation of the loss $W_{loss}$. Then, the loss calculation unit 202 calculates the loss $W_{loss}$ by substituting the determined efficiency η into the formula (10).

Additionally, the efficiency map M1801 is prepared by actual measurement or simulation of the detected rotation speed value w and the efficiency η with the use of the q-axis current $i_q$ being changed, and is stored in a memory. The efficiency map M1801 may be stored in a memory in a form of a function in which the q-axis current $i_q$ and the detected rotation speed value ω serve as inputs and the efficiency η serves as an output, or may be stored in a memory in a form of a lookup table.

As described above, according to the modification of the fourth embodiment, the efficiency η is determined using the efficiency map M1801 in which the efficiencies η for the detected rotation speed value ω in addition to the q-axis current $i_q$ are stored, so that a more appropriate value for the efficiency η can be calculated in accordance with a state of the motor 13. Since the efficiency η is determined using the efficiency map M1801, the efficiency η can be determined without provision of special equipment for obtaining the efficiency η.

Additionally, although the efficiencies η are stored in the efficiency map M1801 discretely while being classified under regions each for two [%] in the example of FIG. 20, which is one example, the efficiencies η may be stored discretely while being classified under regions each for the other number than two [%], or may be continuously stored.

[Second Modification of the Fourth Embodiment]

Although the efficiency η for the q-axis current $i_q$ is stored in the efficiency map M1800, the efficiency η for not the q-axis current $i_q$, but the detected rotation speed value ω, may be stored.

Concise Description of the Embodiments

Features of the present embodiments can be described more concisely as follows.

A load detector according to one aspect of the present invention is intended to detect a load of a hanging cargo, in a crane including: a winch drum around which a wire rope for hanging the hanging cargo is wound; a motor configured to drive the winch drum to achieve lowering or hoisting; a speed reducer configured to adjust torque of the motor at a predetermined speed reduction ratio and transfer the torque to the winch drum; and a power converter configured to supply a current for driving the motor to the motor, and the load detector includes: an output-torque estimation unit configured to obtain, from the power converter, a value of the current supplied to the motor and estimate output torque of the motor from the obtained value of the current; a number setting unit configured to set the winding number of the wire rope; and a load estimation unit configured to estimate a load value of the hanging cargo based on an estimated output torque value resulting from estimation by the output-torque estimation unit, the speed reduction ratio, an effective radius of the winch drum, and the winding number that is set by the number setting unit.

According to this aspect, an estimated output torque value of the motor is calculated based on a value of a current supplied to the motor, and a load value of the hanging cargo is estimated based on the estimated output torque value which is calculated and pre-known specifications of the crane, such as the winding number of the wire rope, a speed reduction ratio of the speed reducer, and an effective radius of the winch drum. Accordingly, as compared to a method in which a load value of a hanging cargo is calculated based on tension of a derricking rope, a load value of a hanging cargo can be directly detected, and a load value of a hanging cargo can be accurately calculated.

Also, according to this aspect, a value of a current supplied to the motor is obtained in order to estimate a load value of the hanging cargo, and thus an extra detector dedicated to detection of tension of the wire rope is unnecessary, which results in reduction of the number of components, reduction in a cost, and improvement in reliability.

In the above-described aspect, the load estimation unit may obtain a rotation angle of the motor from the power converter, calculate a first fluctuation amount that is an amount of fluctuation of the estimated output torque value, the fluctuation being caused due to inertial forces of the hanging cargo, the winch drum, and the motor at a time of hoisting or lowering, based on the obtained rotation angle, correct the estimated output torque value such that the first fluctuation amount is compensated for, and estimate the load value of the hanging cargo using the estimated output torque value that is corrected.

For a hoisting operation, when the hanging cargo is accelerated until the speed of the hanging cargo reaches a constant speed, for example, a value of a current supplied to the motor should be made higher than a current value in a case where the hanging cargo is hoisted at a constant speed. In such a case, the estimated output torque value increases, and a load value of the hanging cargo is calculated to be higher than an actual value. Also, for a hoisting operation, in a case where the hanging cargo is decelerated to a constant speed, a value of a current supplied to the motor should be made lower than a current value when the hanging cargo is hoisted at a constant speed. In such a case, the estimated output torque value decreases, and a load value of the hanging cargo is calculated to be lower than an actual value.

According to this aspect, for a hoisting operation or a lowering operation, the first fluctuation amount which is an amount of fluctuation of the estimated output torque value due to inertial forces of the hanging cargo, the winch drum, and the motor, is calculated, the estimated output torque value is corrected such that the first fluctuation amount is compensated for, and a load value of the hanging cargo is estimated using the estimated output torque value which is corrected. Accordingly, in a case where the hanging cargo is in a transitional motion until the speed reaches a constant speed, a load value of the hanging cargo can be accurately calculated.

In the above-described aspect, the load estimation unit may obtain a rotation speed of the motor from the power converter, calculate a second fluctuation amount that is an amount of fluctuation of the estimated output torque value, the fluctuation being caused due to viscosity loss depending on the obtained rotation speed, based on the obtained rotation speed, and correct the estimated output torque value such that the first fluctuation amount and the second fluctuation amount are compensated for.

According to this aspect, the estimated output torque value is corrected with consideration of also the second fluctuation amount which is an amount of fluctuation of the estimated output torque value due to viscosity loss of the crane, so that the estimated output torque value can be calculated with high accuracy, and a load value of the hanging cargo can be accurately calculated.

In the above-described aspect, when a condition that a varying amount of the value of the current, the value being obtained from the power converter, is smaller than a predetermined reference varying amount, is satisfied, the output-torque estimation unit may calculate a characteristic parameter that indicates a characteristic of the motor and depends on the obtained value of the current, and calculate the estimated output torque value using the calculated characteristic parameter and the value of the current, the value being obtained from the power converter.

With regard to the motor, a characteristic parameter indicating a characteristic of the motor varies in accordance with a value of a current being supplied, and thus, in a case where the characteristic parameter varies considerably, an error occurs in the estimated output torque value unless such variation is considered.

According to this aspect, the estimated output torque value is calculated using a characteristic parameter which depends on a value of a current supplied to the motor, so that the estimated output torque value can be calculated with high accuracy and a load value of the hanging cargo can be accurately calculated.

In the above-described respect, when the condition is satisfied, the output-torque estimation unit may repeatedly perform a process of calculating the characteristic parameter that depends on the obtained value of the current at a constant desired speed while changing the load value of the hanging cargo, generate correspondence information indicating correspondence between the value of the current and the characteristic parameter, determine a characteristic parameter that depends on a presently-provided current value by referring to the correspondence information, and calculate the estimated output torque value using the determined characteristic parameter.

According to this aspect, the correspondence information in which a current value and a characteristic parameter are associated with each other is generated, and a characteristic parameter corresponding to a presently-provided current value is determined by referring to the correspondence information, so that a characteristic parameter corresponding to a current value being provided at present can be accurately calculated.

In the above-described respect, the load estimation unit may estimate the load value of the hanging cargo using a formula (A) where m represents the load value of the hanging cargo, $T_q$ represents the estimated output torque value, J represents a synthetic value of moments of inertia of the winch drum, the motor, and the speed reducer, k represents the winding number, R represents the effective radius of the winch drum, g represents gravitational acceleration, n represents the speed reduction ratio of the speed reducer, and θ represents the rotation angle of the motor.

[Formula 13]

$$m = \frac{T_q - J\frac{d^2\theta}{dt^2}}{\frac{R}{nk}\left(\frac{R}{nk}\frac{d^2\theta}{dt^2} + g\right)} \quad (A)$$

According to this aspect, a load value is estimated using the formula (A), so that a load value can be accurately calculated.

In the above-described aspect, the characteristic parameter may include flux linkage and inductance of the motor.

According to this aspect, out of characteristic parameters of the motor, exact values of flux linkage and inductance which vary considerably depending on a current value, can be obtained, and the estimated output torque value is calculated using the flux linkage and the inductance which are obtained, so that the estimated output torque value can be calculated with high accuracy.

In the above-described aspect, it is preferable that the output-torque estimation unit includes: an obtaining unit configured to obtain the value of the current and a value of a voltage that are supplied to the motor, and the rotation speed of the motor, from the power converter, a loss calculation unit configured to calculate loss of the motor using the obtained value of the current, the obtained value of the voltage, and a previously-determined efficiency of the motor; an iron-loss-current calculation unit configured to calculate an iron-loss current based on a loss equation in which the loss of the motor is expressed by a sum of iron loss and copper loss of the motor, the obtained value of the current, the obtained value of the voltage, and the calculated loss; and a torque determination unit configured to calculate a corrected current value that is equal to the obtained value of the current from which a value of a current not contributing to the torque is removed, by subtracting the calculated iron-loss current from the obtained value of the current, and determine the estimated output torque value based on the corrected current value that is calculated.

According to this aspect, an iron-loss current which does not contribute to torque of the motor is calculated from a loss equation representing loss of the motor, a corrected current value is calculated by subtraction of the calculated iron-loss current from a value of a current supplied to the motor, and the estimated output torque value is calculated using the corrected current value. Accordingly, estimation accuracy of the estimated output torque value can be improved.

In the above-described respect, it is preferable that the obtaining unit further obtains a rotation speed of the motor from the power converter, and the loss calculation unit includes an efficiency map that previously indicates a relationship between at least one of the value of the current supplied to the motor and the rotation speed, and the efficiency of the motor, determines the efficiency of the motor for at least one of the obtained rotation speed and the obtained value of the current, using the efficiency map, and calculates the loss of the motor using the determined efficiency of the motor.

According to this aspect, an efficiency of the motor for at least one of the obtained rotation speed and a value of a current is determined using the efficiency map which previously indicates a relationship between at least one of a value of a current supplied to the motor and the rotation speed of the motor, and an efficiency of the motor. Accordingly, an efficiency of the motor can be obtained without provision of special equipment for obtaining an efficiency of the motor during driving of the motor. As a result of this, a reduced cost resulting from reduction in the number of components of a system, and improvement in reliability, are attained.

A winding apparatus for a crane according to another aspect of the present invention includes the load detector according to the above-described aspect.

According to this aspect, a crane in which a load value of a hanging cargo is accurately calculated can be provided without use of an extra detector dedicated to detection of tension of the wire rope.

The invention claimed is:

1. A load detector for detecting a load of a hanging cargo, in a crane including: a winch drum around which a wire rope for hanging the hanging cargo is wound; a motor configured to drive the winch drum to achieve lowering or hoisting: a speed reducer configured to adjust torque of the motor at a predetermined speed reduction ratio and transfer the torque to the winch drum; and a power converter configured to supply a current for driving the motor to the motor, the load detector comprising:

an output-torque estimation unit configured to obtain, from the power converter, a value of the current supplied to the motor and estimate output torque of the motor from the obtained value of the current;

a number setting unit configured to set the winding number of the wire rope; and a load estimation unit configured to estimate a load value of the hanging cargo based on an estimated output torque value resulting from estimation by the output-torque estimation unit, the speed reduction ratio, an effective radius of the winch drum, and the winding number that is set by the number setting unit, wherein the load estimation unit obtains a rotation angle of the motor from the power converter and calculates a first fluctuation amount that is an amount of fluctuation of the estimated output torque value due to inertial forces of the hanging cargo, the winch drum, and the motor at a time of hoisting or lowering, based on the obtained rotation angle and moments of inertia of the winch drum, the motor, and the speed reducer, corrects the estimated output torque value by subtracting the first fluctuation amount from the estimated output torque value at a time of acceleration, and adding the first fluctuation amount to the estimated output torque value at a time of deceleration, and estimates the load value of the hanging cargo using the estimated output torque value that is corrected.

2. The load detector according to claim 1, wherein the load estimation unit obtains a rotation speed of the motor from the power converter, calculates a second fluctuation amount that is an amount of fluctuation of the estimated output torque value due to viscosity loss depending on the obtained rotation speed, and corrects the estimated output torque value such that the first fluctuation amount and the second fluctuation amount are compensated for.

3. The load detector according to claim 1, wherein when a condition that a varying amount of the value of the current, the value being obtained from the power converter, is smaller than a predetermined reference varying amount, is satisfied, the output-torque estimation unit calculates a characteristic parameter that indicates a characteristic of the motor and depends on the obtained value of the current, and calculates the estimated output torque value using the calculated characteristic parameter and the value of the current, the value being obtained from the power converter.

4. The load detector according to claim 3, wherein when the obtained value of the current satisfies the condition, the output-torque estimation unit repeatedly performs a process of calculating the characteristic parameter that depends on the obtained value of the current at a constant desired speed while changing the load value of the hanging cargo, generates correspondence information indicating correspondence between the value of the current and the characteristic parameter, determines a characteristic parameter that depends on a presently-provided current value by referring to the correspondence information, and calculates the estimated output torque value using the determined characteristic parameter.

5. The load detector according to claim 1, wherein the load estimation unit estimates the load value of the hanging cargo using a formula (A) where m represents the load value of the hanging cargo, $T_q$ represents the estimated output torque value, J represents a synthetic value of moments of inertia of the winch drum, the motor, and the speed reducer, k represents the winding number, R represents the effective radius of the winch drum, g represents gravitational acceleration, n represents the speed reduction ratio of the speed reducer, and θ represents the rotation angle of the motor:

[Formula 1]

$$m = \frac{T_q - J\frac{d^2\theta}{dt^2}}{\frac{R}{nk}\left(\frac{R}{nk}\frac{d^2\theta}{dt^2} + g\right)}. \quad (A)$$

6. The load detector according to claim 3, wherein the characteristic parameter includes flux linkage and inductance of the motor.

7. The load detector according to claim 1, wherein the output-torque estimation unit includes:

an obtaining unit configured to obtain the value of the current and a value of a voltage that are supplied to the motor, from the power converter, a loss calculation unit configured to calculate loss of the motor using the obtained value of the current, the obtained value of the voltage, and a previously-determined efficiency of the motor;

an iron-loss-current calculation unit configured to calculate an iron-loss current based on a loss equation in which the loss of the motor is expressed by a sum of iron loss and copper loss of the motor, the obtained value of the current, the obtained value of the voltage, and the calculated loss; and a torque determination unit configured to calculate a corrected current value that is equal to the obtained value of the current from which a value of a current not contributing to the torque is removed, by subtracting the calculated iron-loss current from the obtained value of the current, and determine the estimated output torque value based on the corrected current value that is calculated.

8. The load detector according to claim 7, wherein the obtaining unit further obtains the rotation speed of the motor from the power converter, and the loss calculation unit includes an efficiency map that previously indicates a relationship between at least one of the value of the current supplied to the motor and the rotation speed, and the efficiency of the motor, determines the efficiency of the motor for at least one of the obtained rotation speed and the obtained value of the current, using the efficiency map, and calculates the loss of the motor using the determined efficiency of the motor.

9. A winding apparatus for a crane, comprising the load detector as recited in claim 1.

* * * * *